United States Patent
Cage et al.

[11] Patent Number: 5,907,104
[45] Date of Patent: May 25, 1999

[54] SIGNAL PROCESSING AND FIELD PROVING METHODS AND CIRCUITS FOR A CORIOLIS MASS FLOW METER

[75] Inventors: Donald R. Cage; David T. Hahn, both of Longmont; Michael N. Schott, Loveland; Larry K. Carmichael, Westminster, all of Colo.

[73] Assignee: Direct Measurement Corporation, Longmont, Colo.

[21] Appl. No.: 08/569,967

[22] Filed: Dec. 8, 1995

[51] Int. Cl.$^6$ .......................................................... G01F 1/84
[52] U.S. Cl. ........................................................ 73/861.355
[58] Field of Search ....................... 73/861.355, 861.356, 73/861.357, 861.18

[56] References Cited

U.S. PATENT DOCUMENTS

| | | |
|---|---|---|
| Re. 31,450 | 11/1983 | Smith . |
| 3,444,723 | 5/1969 | Wakefield . |
| 3,485,098 | 12/1969 | Sipin . |
| 3,874,221 | 4/1975 | Lockie . |
| 3,927,565 | 12/1975 | Pavlin et al. . |
| 4,009,616 | 3/1977 | Wonn . |
| 4,109,524 | 8/1978 | Smith . |
| 4,217,774 | 8/1980 | Agar . |
| 4,420,983 | 12/1983 | Langdon . |
| 4,422,338 | 12/1983 | Smith . |
| 4,490,009 | 12/1984 | Nakai et al. . |
| 4,491,025 | 1/1985 | Smith et al. . |
| 4,574,639 | 3/1986 | Ward . |
| 4,622,858 | 11/1986 | Mizerak . |
| 4,628,744 | 12/1986 | Lew . |
| 4,653,332 | 3/1987 | Simonsen . |
| 4,680,974 | 7/1987 | Simonsen et al. . |
| 4,691,578 | 9/1987 | Herzl . |
| 4,711,132 | 12/1987 | Dahlin . |
| 4,716,771 | 1/1988 | Kane . |
| 4,729,243 | 3/1988 | Friedland et al. . |

(List continued on next page.)

FOREIGN PATENT DOCUMENTS

| | | |
|---|---|---|
| 3 0 109 218 | 5/1984 | European Pat. Off. . |
| 4 0 119 638 | 9/1984 | European Pat. Off. . |
| 0 210 308 | 2/1987 | European Pat. Off. . |
| 0 261 435 | 3/1988 | European Pat. Off. . |
| 0 272 758 | 6/1988 | European Pat. Off. . |
| 0 316 908 | 5/1989 | European Pat. Off. . |
| 0 375 300 | 6/1990 | European Pat. Off. . |
| 2 598 801 | 11/1987 | France . |
| 35 05 166 C2 | 8/1987 | Germany . |
| 88 14 606.5 | 9/1989 | Germany . |
| 57-137818 | 8/1982 | Japan . |
| 58-20926 | 7/1983 | Japan . |
| 62-180741 | 8/1987 | Japan . |
| 1008-617 | 2/1980 | Sudan . |
| 2 171 200 | 8/1986 | United Kingdom . |
| WO 85-05677 | 12/1985 | WIPO . |
| WO 87/06691 | 11/1987 | WIPO . |

OTHER PUBLICATIONS

Publication entitled "Direkte Massedurchflussmessung, Insbesonderemit Coriolisverfahren" by Von W. Steffen und Dr. W. Stumm; Part II; pp. 301–305; Published in "Messen Prüfen Automatisieren" vol. 23 (1987) May, No. 5, pp. 301–305; Bad Wörishofen, W. Germany.

*Primary Examiner*—Ronald L. Biegel
*Assistant Examiner*—Jewel Artis
*Attorney, Agent, or Firm*—Hitt Chwang & Gaines, P.C.

[57] ABSTRACT

A signal processing apparatus and method for measuring a mass flow rate of a fluid flowing in conjunction with a surface of a Coriolis mass flow meter and a field-provable Coriolis mass flow meter. The apparatus includes: (1) a driver for creating a prescribed vibration in the surface, (2) a motion sensor for measuring a motion of the surface, (3) response characteristic determination circuitry, coupled to the motion sensor, for determining a response characteristic of the surface and (4) flow rate calculation circuitry, coupled to the response characteristic determination circuitry, for calculating a measured mass flow rate of the fluid as a function of the motion and the response characteristic. The field-provable meter employs the response characteristic to monitor or compare meter performance without requiring a separate proving device.

54 Claims, 13 Drawing Sheets

U.S. PATENT DOCUMENTS

| | | |
|---|---|---|
| 4,733,569 | 3/1988 | Kelsey et al. . |
| 4,756,197 | 7/1988 | Herzl . |
| 4,768,384 | 9/1988 | Flecken et al. . |
| 4,776,220 | 10/1988 | Lew . |
| 4,793,191 | 12/1988 | Flecken et al. . |
| 4,798,091 | 1/1989 | Lew . |
| 4,803,867 | 2/1989 | Dahlin . |
| 4,811,606 | 3/1989 | Hasegawa et al. . |
| 4,813,289 | 3/1989 | Lew . |
| 4,823,614 | 4/1989 | Lew . |
| 4,829,832 | 5/1989 | Lew . |
| 4,831,885 | 5/1989 | Dahlin . |
| 4,852,410 | 8/1989 | Corwon et al. . |
| 4,856,346 | 8/1989 | Kane . |
| 4,869,097 | 9/1989 | Tittmann et al. . |
| 4,879,910 | 11/1989 | Lew . |
| 4,882,935 | 11/1989 | Lew . |
| 4,891,991 | 1/1990 | Mattar et al. . |
| 4,934,195 | 6/1990 | Hussain . |
| 4,949,583 | 8/1990 | Lang et al. . |
| 5,024,104 | 6/1991 | Dames . |
| 5,040,415 | 8/1991 | Barkhoudarian . |
| 5,044,207 | 9/1991 | Atkinson et al. . |
| 5,069,075 | 12/1991 | Hansen et al. . |
| 5,226,330 | 7/1993 | Lew . |
| 5,230,254 | 7/1993 | Craft . |
| 5,373,745 | 12/1994 | Cage . |

SIGNAL PROCESSING AND FIELD PROVING METHODS AND CIRCUITS FOR A CORIOLIS MASS FLOW METER

CROSS-REFERENCE TO RELATED APPLICATIONS

The present invention is related to that disclosed in Ser. No. 08/233,687, filed on Apr. 26, 1994, and entitled "Coriolis Mass Flow Rate Meter Having Adjustable Pressure and Density Sensitivity," that is commonly assigned with the present invention and incorporated herein by reference.

TECHNICAL FIELD OF THE INVENTION

The present invention is directed, in general, to vibrating instruments and, more specifically, to signal processing and field proving methods and circuits for Coriolis mass flow meters.

BACKGROUND OF THE INVENTION

In the field of flow meters, Coriolis flow meters are unique in that they can directly measure the mass flow rate of a fluid with little or no intrusion into the fluid stream. Because of this, they have become increasingly popular and currently account for the fastest growing segment of the overall flow meter market.

Over the last 15 years, there has been a rapid evolution of developments in the field of Coriolis flow meters. These developments have concentrated on improving performance by optimizing flow conduit shapes and introducing improved signal processing techniques and different modes of vibration.

This evolutionary process began with the introduction of the first commercially-viable Coriolis mass flow meter using a U-shaped flow conduit vibrated in its first bending mode of vibration. The signal processing scheme employed was a time delay measurement between inlet and outlet motion signals. This method could give useful results, however, it was understood at that time that the elastic modulus of the vibrating portion of the flow conduit was itself a function of temperature, and that any changes therein change the sensitivity of the device. The temperature of the flow conduit had to be measured; then, the effect of temperature upon the elastic modulus of the flow conduit had to be characterized and a compensation value added to the flow signal to minimize the effects of changes in the elastic modulus of the flow conduit.

For example, 316L stainless steel is commonly used for the flow conduit material in these devices, yielding a theoretical tensile elastic modulus vs. temperature relationship of about −2.2% per 100° F. increase (in the range between 0° F. and 350° F.) and nearly linear for that material. Therefore, the compensation value is commonly applied in a linear relationship to account for the effects of temperature on tensile elastic modulus. It should be noted here that some meter designs depend upon the shear modulus rather than the tensile modulus, or a combination thereof, and a corresponding compensation value exists thereto.

While the prior art compensation method was simple, it was also known that 316L elastic modulus became increasingly non-linear as the temperature became colder or hotter, and in general, for most common conduit materials, the elastic modulus vs. temperature curves are non-linear. This fact therefore necessitated adding more complex temperature compensation methods to account for a wider range of materials and non-linear temperature relationships.

As more Coriolis flow meters of different designs were put into service, it was found that not only temperature, but fluid density and pressure could also effect the sensitivity of the device. This realization prompted the same type of response from manufacturers as did the temperature problem earlier described in that the effects were required to be characterized and compensated for.

In the case of density effects, many types of Coriolis flow meters can calculate the density by virtue of the natural frequency of the conduit thereby yielding a signal proportional to density that can be used to compensate for density effects on sensitivity.

In the case of pressure effects, it was found that by restricting the conduit geometry to certain design relationships, pressure effects could be minimized. In either case however, the result was either more compensation circuit complexity or geometric design restrictions.

Flow meters with straight flow conduits were later introduced into the market. These meters are subject to temperature gradients between the flow conduit and the surrounding support structure that cause stresses in the flow conduit that can alter the sensitivity and zero of the device. Several methods were therefore introduced to accommodate this added problem, such as measuring the difference in temperature between the flow conduit and its support and calculating what the stress should be and deriving a compensation value based on that difference. Methods employing strain gages have also been employed for the purpose of determining the stress level and deriving the requisite compensation value, again adding more complexity to the circuit and necessitating greater understanding of the complex relationships between stress and the change in the sensitivity of a given device.

While the prior discussion has dealt primarily with effects on the sensitivity of a flow meter, another important flow measurement parameter is the zero. Since Coriolis flow meters are highly linear devices (or are made to have linear outputs) relative to mass flow rate, the two most important mathematical factors allowing their use as flow measurement devices are therefore (a) the slope of the output signal vs. the mass flow rate therein (here defined as the "sensitivity" or "K-factor"), and (b) the value of the output signal at the intercept of the line with a zero mass flow point (herein defined as the "zero").

The zero has been a much more elusive parameter for manufacturers to control because zero shifts are not usually caused by predictable changes in material constants etc., but can be caused by a number of subtle and interrelated problems in both the mechanics of the flow conduit, and in the electronics, both by design or by imperfections therein. These zero shifts are normally encountered along with changes in fluid or ambient conditions on the device similar to those just described for sensitivity effects, e.g., changes in temperature, pressure, density, frequency, viscosity or conduit stress.

To summarize the history, as Coriolis flow meter manufacturers have discovered effects on their devices that cause errors or changes in the sensitivity of their devices, they have generally chosen to characterize, measure and compensate for each effect individually, thereby creating complex compensation methods that are more expensive and less accurate than the method disclosed herein. A similar progression has taken place toward zero effects as well.

Although these various means and methods just described (and others not described) are employed to measure, and compensate for parameters that effect Coriolis flow meter sensitivity and zero, the primary and fundamental goal of all of these have been to simply determine the sensitivity and/or zero of the device to fluid flow, and then compensate for any changes therein. What is needed in the art is a way of avoiding the need to measure and compensate. What is needed is systems and methods for directly determining sensitivity or zero characteristics, or both, of a Coriolis flow measurement device, thereby allowing overall compensation for any changes in sensitivity or zero characteristics, regardless of source.

SUMMARY OF THE INVENTION

To address the above-discussed deficiencies of the prior art, it is a primary object of the present invention to provide methods and apparatus to directly determine the sensitivity or zero, characteristics (each an example of a "response characteristic") of a Coriolis flow measurement device, and to compensate for any changes therein, regardless of the cause of those changes.

In the attainment of the above-described primary object, the present invention provides a signal processing apparatus and method for measuring a mass flow rate of a fluid flowing in conjunction with a surface of a Coriolis mass flow meter and a field-provable Coriolis mass flow meter. The apparatus includes: (1) a driver for creating a prescribed vibration in the surface, (2) a motion detector for measuring the motion of the surface, (3) a circuit for determining a response characteristic of the surface to mass flow rate or other prescribed forces and (4) calculation circuitry for calculating a measured mass flow rate of the fluid as a function of the motion and the sensitivity. In a preferred embodiment, the circuit for determining the response characteristics includes a circuit for determining a frequency response of the surface to mass flow rate or other prescribed forces. In a related embodiment, the circuit for determining the frequency response determines the frequency response from a reference excitation applied to the surface.

Both sensitivity and/or zero changes can thus be determined dynamically, and compensated for using the present invention. This eliminates the need to know the complex relationships between sensitivity and zero, and temperature, pressure, density, viscosity, conduit stress, etc., and likewise eliminates the need to include apparatus and circuitry to individually measure and compensate for these effects.

The present invention introduces the concept of an excitation reference. The excitation reference is employed to cause a prescribed excitation (reference excitation) on the vibrating portion of the flow meter, in addition to the normal driven vibration. The response to the reference excitation is then measured and, from the measurement, the response characteristic of the device can then be determined, regardless of the combination of fluid or ambient effects that may be acting upon it.

In a preferred embodiment of the present invention, the surface is associated with a conduit. In alternative related embodiments, the fluid is flowable within the conduit or without the conduit, or relative to a surface of arbitrary shape.

In a preferred embodiment of the present invention, the driver is selected from the group consisting of: (1) a magnet/ coil pair, (2) a piezoelectric driver and (3) an electrostatic driver.

In a preferred embodiment of the present invention, the surface is associated with an arbitrary surface, the fluid flowable in conjunction with the arbitrary surface.

In a preferred embodiment of the present invention, the additional reference excitation is selected from the group consisting of: (1) a force proportional to the reference mass flow rate, (2) a force proportional to the vibration of the surface, (3) a Coriolis mode of vibration, (4) a force at an arbitrary frequency, (5) white or random noise and (6) a swept frequency wave.

In a preferred embodiment of the present invention, the motion sensor is selected from the group consisting of: (1) a magnet/coil pair, (2) a piezoelectric sensor, (3) an optical sensor, (4) a strain gage and (5) an electrostatic sensor.

In a preferred embodiment of the present invention, the flow rate calculation circuitry means calculates the measured mass flow rate of the fluid as a function of a one selected from the group consisting of: (1) time delay, (2) phase angle, (3) amplitude, (4) velocity, (5) acceleration and (6) motion multiplied by frequency $\Omega_{drv}{}^N$, where N is any positive or negative real number or integer.

In a preferred embodiment of the present invention, the flow rate calculation circuitry determines response at a driven vibration frequency and determines a one selected from the group consisting of: (1) damping of a response curve and a peak value, (2) damping by a logarithmic decrement method, (3) damping as a function of phase angle between excitation and response and (4) damping as a function of bandwidth.

In a preferred embodiment of the present invention, the flow rate calculation circuitry calculates a one selected from the group consisting of: (1) a Fourier transform of the vibration and the additional reference excitation and (2) a power necessary to maintain a Coriolis mode amplitude.

In a preferred embodiment of the present invention, the flow rate calculation circuitry calculates a sensitivity and a zero.

In a preferred embodiment of the present invention, the response to the additional reference excitation is selected from the group consisting of: (1) an intermittent modulation of mass flow related signal, (2) a continuous modulation of mass flow related signal, (3) a magnitude of peak to peak modulation, (4) a difference between modulated amplitude and average flow rate value, (5) a ratio of response in Coriolis mode to response in driven mode, (6) an average modulated value and (7) a magnitude of response motion.

Several embodiments and methods are hereinafter described wherein the vibrating portion of the flow meter is excited via the excitation reference and the response to that excitation is measured for the determination of sensitivity and/or zero, and any changes therein.

Another preferred embodiment of the present invention is the ability to precisely monitor any changes in the sensitivity and zero of the device as just described, which is the fundamental goal of the industry directed to "field proving" flow meters.

In many fluid flow measurement applications a periodic calibration verification is required for the flow measurement device. This is particularly true in custody transfer applications where the customer is billed based on the amount registered by the flow meter. "Proving," is therefore a common term used to describe the periodic flow meter calibration verification. Several techniques of proving flow meters are commonly used in industry today, including: a conventional pipe prover, a small volume prover, a master meter, a gravimetric tank and a volumetric tank.

Each of the aforementioned proving techniques require substantial ancillary equipment that must be transported to each flow meter proving site. The equipment requires installation, preparation for use, and then must be removed after the proving tests are completed. Obviously, considerable time and expense are required for conventional field proving of flow meters. In addition, many applications cannot be successfully "proved" in the field because of fluid, pressure, flow rate, or other restrictions that a prover device may not be rated to handle.

Therefore, a method for field proving Coriolis flow meters that eliminates the need for ancillary equipment, and reduces the time and expense required to prove a flow meter, would greatly benefit many industries.

The present invention therefore describes methods and apparatus for proving Coriolis mass flow meters by means of independently determining the response characteristics of the device. This is preferably accomplished by applying prescribed excitations to the flow sensing element. The response of the flow sensing element to these excitations can be used to determine the sensitivity and/or zero of the device that can be compared to those determined at the time of original calibration, thereby determining whether or not a change has occurred in the sensitivity or zero of the flow meter. These sensitivity and zero values, or any changes therein, are normally then recorded and used for custody transfer rate determination purposes, and often compared to a limit beyond that the flow meter may be required to be recalibrated.

It is further a primary object of the present invention to provide a circuit and method for field proving flow measurement devices to determine any shifts in the sensitivity of the meter. The circuit comprises response characteristic determination means for determining a response characteristic of the meter (preferably done by creating an additional reference excitation in the surface simulating an effect of a reference mass flow rate of a fluid flowing relative to the surface on the vibration of the surface).

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Basic Theory of Operation

A Coriolis mass flow meter is a device that measures the mass flow rate of a fluid flowing past a vibrating surface. The vibrating surface is often provided in the form of a flow conduit or tube through which the fluid is caused to flow. More recently, Coriolis flow meters using tubular or surfaces of arbitrary shape, outside or over which fluid is caused to flow, have also been employed. This distinction is immaterial in the discussion of the present invention, since it applies to any of these devices. Therefore, the term "vibrating surface" will be henceforth used primarily and can be taken to mean a traditional flow conduit or tube through which fluid is passed, outside of which fluid is passed, or an arbitrary surface interacting with the fluid to be measured.

Figure 1:
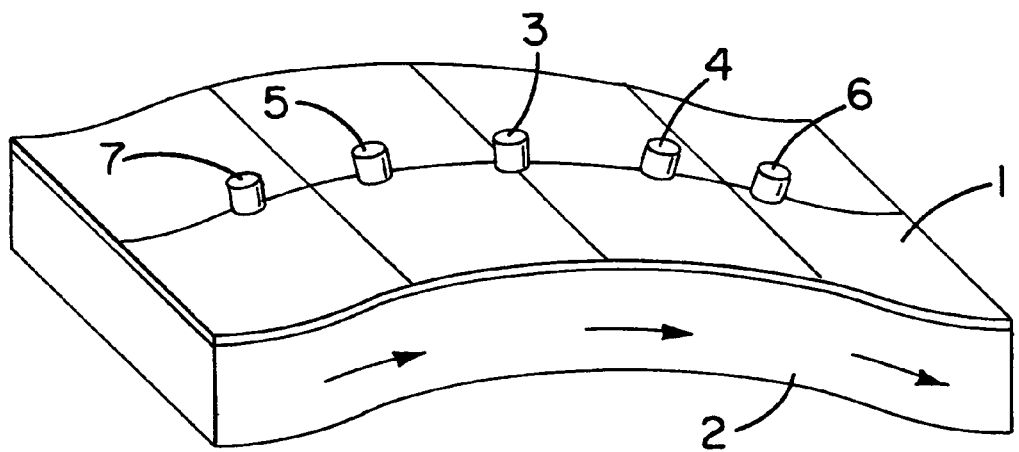
FIG. 1 illustrates a section of a vibrating surface of a Coriolis mass flow meter shown deflected in its driven mode of vibration, along with the moving fluid with which it interacts.
Figure 2:
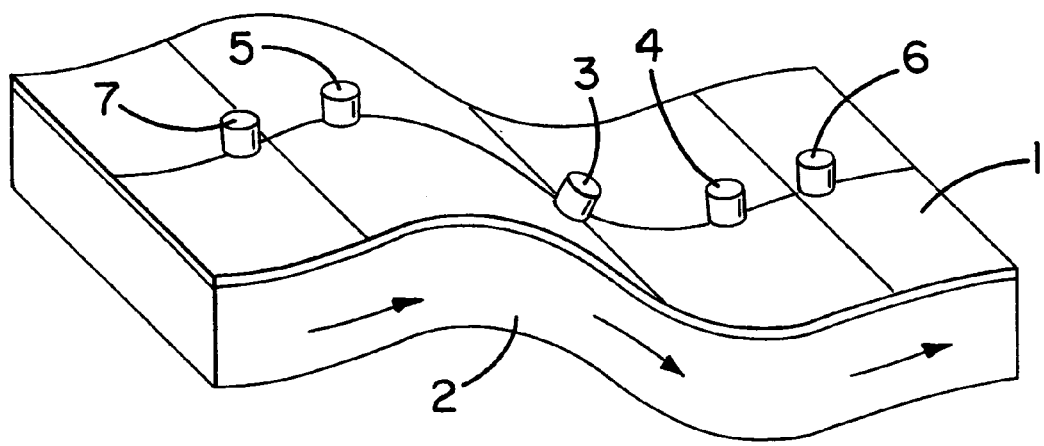
FIG. 2 illustrates the vibrating surface of FIG. 1 shown deflected due to the Coriolis force distribution that results from movement of the fluid.
Figure 6:
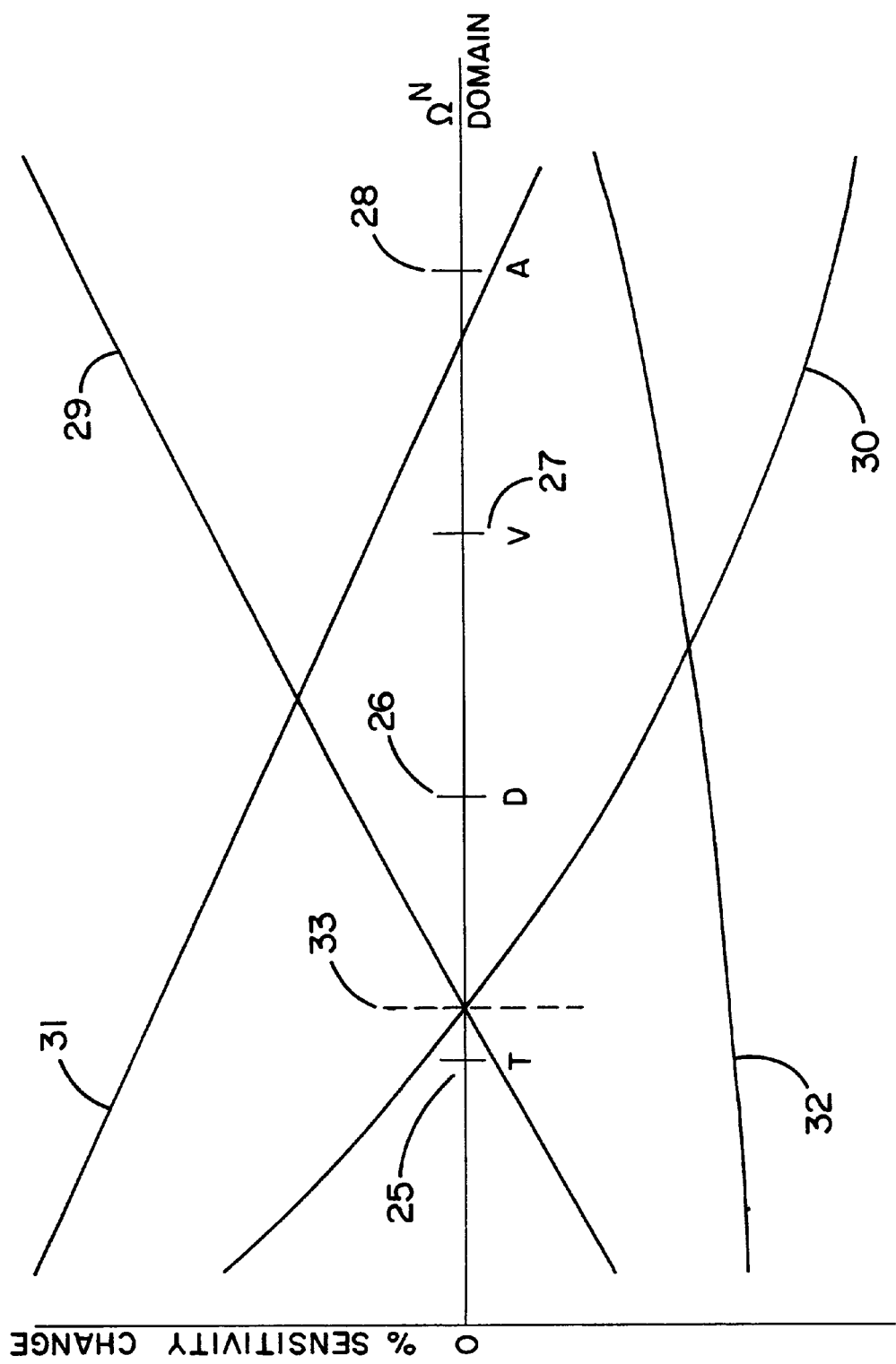
FIG. 6 illustrates characteristic curves illustrating the sensitivity dependency of a Coriolis flow meter to a variety of parameters such as fluid pressure and density, conduit temperature and stress.

Referring initially to FIGS. 1, 2 and 6, illustrated are (in FIG. 1) a section of a vibrating surface of a Coriolis mass flow meter shown deflected in its driven mode of vibration, along with the moving fluid with which it interacts, (in FIG. 2) the vibrating surface of FIG. 1 shown deflected due to the Coriolis force distribution that results from movement of the fluid and (in FIG. 6) characteristic curves illustrating the sensitivity dependency of a Coriolis flow meter to a variety of parameters such as fluid pressure and density, surface elasticity and stress.

A vibrating surface 1 interacts with a fluid 2 to be measured in such a way as to cause a Coriolis acceleration of the fluid and thereby resulting Coriolis forces to bear against the vibrating surface 1. This in turn causes physical distortions in the vibrating surface 1 as shown in FIG. 2, that can be measured and related to the mass flow rate of the fluid passing over or through the vibrating surface 1. These Coriolis forces occur in accordance with the following general equation (1).

$$F_{cor} = -2 * m * (\Omega_{cor} \times V) \qquad (1)$$

where:

$F_{cor}$=resulting Coriolis force, m=mass of the moving fluid, $\Omega_{cor}$=rotational velocity vector of the moving fluid mass, V=linear velocity vector of the moving fluid mass and x=a cross product operator.

For the purpose of clarification, it is useful to derive some basic relationships concerning Coriolis forces and their effects on a vibrating surface with regard to the type of sensor or measurement method used to determine these Coriolis forces and the mass flow rate.

Figure 15:
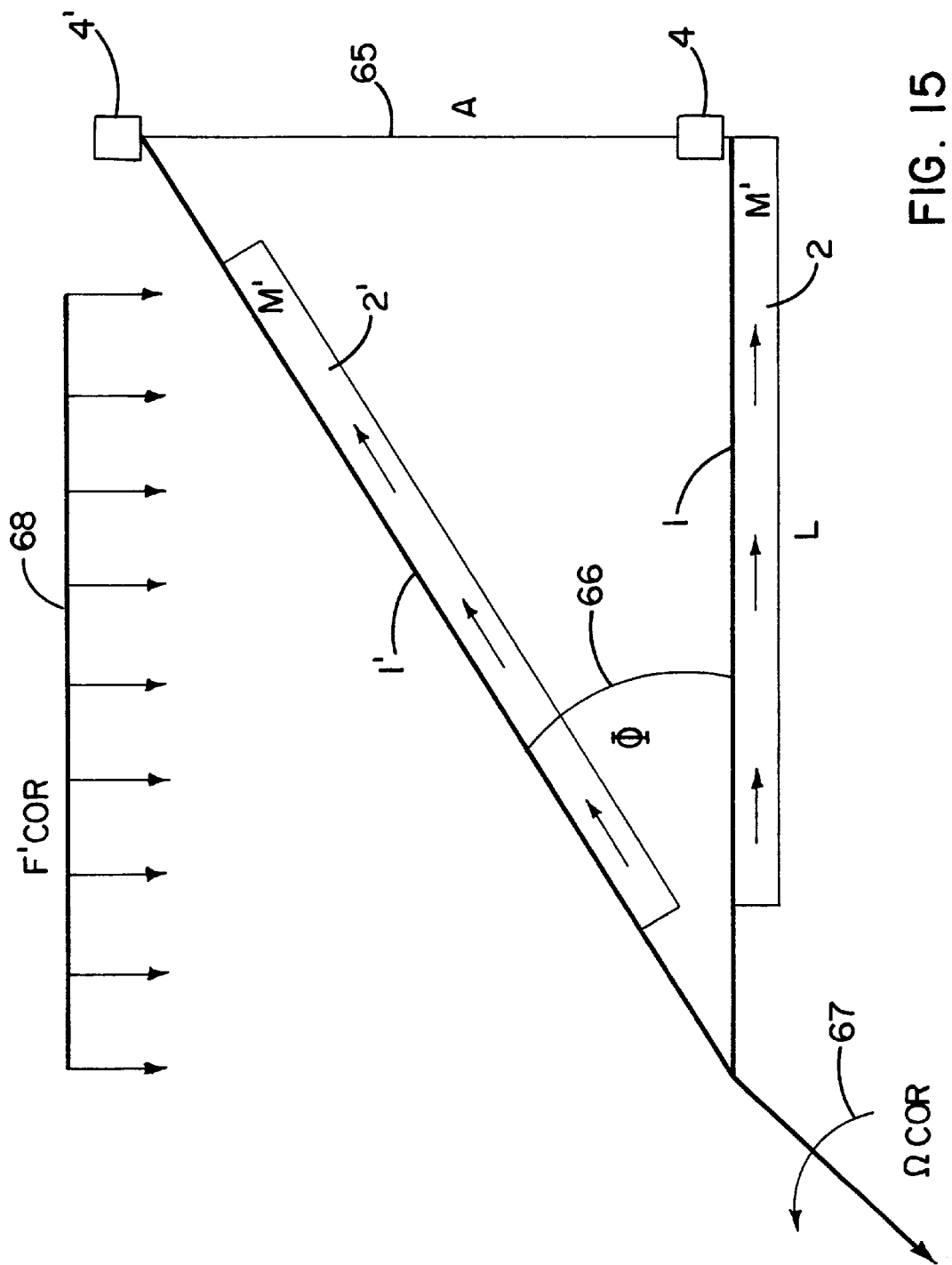
FIG. 15 illustrates relationships between surface geometry, mass flow and Coriolis forces.

Turning now to FIG. 15, depicted is the fluid 2 having a mass flow rate and associated with the vibrating surface 1, where mass flow m' 2 is initially moving horizontally to the right, as shown, in conjunction with the vibrating surface 1. A moment later in time, due to the vibration of the vibrating surface 1, the mass flow 2 has rotated through some angle Φ 66 and is then moving in a new direction 2'. The motion sensor 4 mounted on the vibrating surface 1 moves from its initial position to its new position 4', thereby displacing a distance A 65. Equation (1) gives the fundamental relationship for determining the Coriolis force of a moving mass. Since the fluid mass per unit length along the vibrating surface 1 multiplied by its velocity is the mass flow rate m', this substitution may be made into equation (1) (and changing the cross product to a multiplication due to the 90° relationship), yielding equation (2) describing the Coriolis force per unit length F'$_{cor}$ 68 along the vibrating surface 1:

$$F'_{cor} = -2*m'*\Omega_{cor} \quad (2)$$

where:

F'$_{cor}$=resulting Coriolis force per unit length, m'=Mass flow rate interacting with vibrating surface 1 and $\Omega_{cor}$=rotational velocity of the mass flow.

Since the vibration of the vibrating surface 1 is sinusoidal in time, the displacement A 65 of the sensor 4 is also a sinusoidal function of time as in equation (3):

$$A = a*cos(\Omega_{drv}*t) \quad (3)$$

where:

A=Displacement of motion sensor 4 as a function of time, a=Maximum displacement of motion sensor 4, $\Omega_{drv}$=Driven vibration frequency and t=time.

Since, for small angles, the sine of an angle approximates the angle itself, the angle Φ 66 can be taken to be equal to A/L:

$$\Phi = A/L \quad (4)$$

therefore, substituting equation (3) into equation (4) yields equation (5):

$$\Phi = a*cos(\Omega_{drv}*t)/L \quad (5)$$

Since the Coriolis rotational velocity $\Omega_{cor}$ is the rate of change of angle Φ as a function of time, then:

$$\Omega_{cor} = d\Phi/dt = -a*\Omega_{drv}*sin(\Omega_{drv}*t)/L \quad (6)$$

Substituting equation (6) back into equation (2) yields the following equation (7):

$$F'_{cor} = -2*m'*-a*\Omega_{drv}*sin(\Omega_{drv}*t)/L \quad (7)$$

Simplifying equation (7) and removing constants yields the following relation involving the resulting Coriolis force over the length considered.

$$F_{cor} \propto m'*a*\Omega_{drv}*sin(\Omega_{drv}*t) \quad (8)$$

where:

F$_{cor}$=resulting Coriolis force over the length considered

Assuming, for the moment, that the Coriolis force F$_{cor}$ is caused to act on a surface that has the characteristics of a linear spring without any dynamic or other complicating effects, equation (9) would describe the displacement of that surface as follows:

$$F_{cor} = k*x_{cor} \quad (9)$$

where:

F$_{cor}$=resulting Coriolis force, x$_{cor}$=Coriolis force-related displacement of the vibrating surface 1 and k=linear static spring constant of the vibrating surface 1.

Substituting equation (9) into equation (8) yields the following:

$$k*x_{cor} \propto m'*a*\Omega_{drv}*sin(\Omega_{drv}*t) \quad (10)$$

Rearranging equation (10) to solve for mass flow rate m' yields the following relation (11):

$$m' \propto x_{cor}*k/a*\Omega_{drv}*sin(\Omega_{drv}*t) \quad (11)$$

Historically, it was found that the time delay Δt for the motion sensor 4 to move the distance of the Coriolis deflection x$_{cor}$ was roughly proportional to the mass flow rate in certain situations. Since this time delay is equal to the Coriolis displacement x$_{cor}$ divided by the velocity of the motion sensor 4, (the rate of change of displacement A 65 with respect to time), then:

$$\Delta t = x_{cor}/a*\Omega_{drv}*sin(\Omega_{drv}*t) \quad (12)$$

Substituting equation (12) into equation (11) yields the simple relation (13):

$$m' = \Delta t*k \quad (13)$$

Therefore, in this simplified analysis, the mass flow rate m' is proportional to the time delay Δt multiplied by the spring constant k of the vibrating surface 1. As the stiffness k of the vibrating surface 1 changes due to temperature, compensation can be added. The early developers of Coriolis mass flow meters took this approach and initially gave reasonable results for certain flow tube (surface) geometries and designs. However, in a more general case, this method is inadequate. Many surface designs were found to change sensitivity to flow rate as a function of other fluid and ambient related parameters such as: temperature, elasticity, material damping in the vibrating surface, pressure, density, viscosity, stress or driven amplitude.

Therefore, the present invention addresses the more general case, allowing the true mass flow rate to be determined regardless of the combination of affects that may be acting on the vibrating surface 1.

Not only are the magnitude of the resultant physical distortions greatly affected by ambient and fluid parameters, these ambient and fluid parameters have varying effects on the sensitivity of a device depending upon the "domain" in which the flow-related signal is acquired and used. For example, most signal processing methods employed today, as in the previous analysis, measure time delay and therefore operate in the time delay domain, reducing pressure and density effects on certain restricted conduit or surface geometries. However, this domain tends to exacerbate sensitivity changes due to temperature, stress, viscosity, and other effects.

To highlight the point, FIG. 6 graphically depicts the response characteristics of a given Coriolis flow meter design. On the graph, the vertical axis represents the percentage change in the sensitivity of a given Coriolis flow meter design for a given change in a fluid or conduit-related parameter such as pressure, density, viscosity, temperature or stress. The horizontal axis represents the domain in which the Coriolis-related signal is processed. The identified positions along the domain axis are time delay 25, displacement (or phase multiplied by driven amplitude) 26, velocity 27 and acceleration 28. Each identified domain is related to the next by virtue of a mathematical relationship through the frequency of driven vibration.

For example, if a signal represents the velocity of motion, the displacement of that motion is related to the integral of that velocity over time. The units of velocity for example could be represented by inches per second, and therefore dividing by the driven frequency ($\Omega_{drv}$) with units of 1/seconds yields a displacement-related signal with units of inches. Therefore, simply by dividing the velocity signal by a signal proportional to the driven frequency ($\Omega_{drv}$) a signal proportional to the displacement is obtained. By dividing this displacement signal with units of inches by the driven frequency with units of 1/seconds, a signal proportional to the time delay times the driven amplitude, with units of inch-seconds, is thereby obtained. Alternately the time difference between the upstream and downstream motion could be measured directly yielding a similar result without the amplitude dependence (units of seconds rather than inch-seconds). This measurement of time delay is the most commonly used method on currently available Coriolis mass flow meters today as was previously explained with regard to the analysis of equations (1) through (13) above.

Similarly, since a phase angle can be defined as the time delay times the driven frequency ($\Omega_{drv}*\Delta t$), measuring the phase angle between the upstream and downstream motion yields the same position 26 along the domain line as displacement except that a phase measurement is independent of driven amplitude and would therefore have no units. Therefore, the positions 25, 26, 27, 28 along the domain line are related to each other by virtue of integer divisions (or multiplications) of the driven frequency $\Omega_{drv}$.

Any position along the domain line can therefore be achieved by either obtaining one or more Coriolis-related flow signals by virtue of a sensor type (e.g., velocity, displacement or acceleration sensor) or by a measurement method (e.g., phase or time delay measurement). The primary difference between these two approaches is that if an amplitude-related sensor or method is used to measure the Coriolis-related signals (e.g., velocity, displacement or acceleration sensor) the result is amplitude dependent, whereas the result is independent of the driven amplitude if a phase or time delay method is used.

While these integer-related positions 25, 26, 27, 28 are understandable because of their applicability to actual types of motion sensors or processing methods (e.g., velocity sensors, displacement sensors, accelerometers or strain gages, time delay or phase measurements) characteristic curves 29, 30, 31, 32 are continuous along the domain line, including all points between the positions 25, 26, 27, 28.

Therefore, to alter the domain of the acquired signal from, for example, the velocity domain, to an arbitrary point 33 along a domain line, a velocity signal could be divided (or multiplied) by a signal proportional to the frequency raised to a power of N ($\Omega_{drv}^N$, where N is the number of multiples (whole or fractional) of frequency necessary to move to that domain, and can be any real number or integer, positive or negative. In this example, dividing the velocity domain signal by the frequency raised to an N value of 1 therefore represents a shift to the displacement domain 26. Similarly, dividing the velocity domain signal by the frequency raised to an N value of 2 therefore represents a shift to the time delay domain 25. To achieve the arbitrary position 33, located ¼th of the way between time delay and displacement domains, the velocity domain signal should be divided by the frequency raised to an N value of 1.75.

Characteristic curves 29, 30, 31, 32 therefore represent the percent sensitivity change of a given meter design for a given parameter change, as a function of the domain in which the signals are processed. The curve 29 represents the change in the sensitivity of a given meter to a given increase in the fluid pressure as a function of the domain in which the signals are processed. The curve 30 represents the change in the sensitivity of a given meter to a given increase in the fluid density as a function of the domain in which the signals are processed. The curve 31 represents the change in the sensitivity of a given meter to a given decrease in the vibrating surface 1 elastic modulus as a function of the domain in which the signals are processed. Finally, the curve 32 represents the change in the sensitivity of a given meter to a given increase in the tensile stress of the vibrating surface 1 as a function of the domain in which the signals are processed.

Any parameter that can effect the sensitivity of a given meter design therefore has a corresponding characteristic curve lying on the graph of FIG. 6. With reference to the specific curves 29, 30, 31, 32 of FIG. 6, it is apparent that (for this example) the pressure and density characteristic curves 29, 30 intersect a zero sensitivity change line 33 near (but not exactly in) the time delay domain 25. Since this is characteristic of many currently commercially-available Coriolis flow meter designs, virtually all signal processing schemes to date operate in the time delay domain to take advantage of this coincidence to minimize pressure and density effects. To eliminate pressure and density effects, the proper domain in which to work is that of domain 33, achieved by dividing the velocity domain signal by the frequency raised to a value of N equal to 1.75, since this is the position at which the meter experiences no substantial density or pressure effect.

Although this example clearly illustrates that pressure and density effects may be eliminated, the elastic modulus characteristic curve 31 and stress characteristic curve 32 both have finite, nonzero sensitivity change values in the domain 33. Therefore, these parameters must still be known and factored out in processing resulting mass flow signals.

The shapes and zero intercepts of these characteristic curves can vary widely depending on a number of factors, including the design of the vibrating surface 1 and the manner in which the driven vibration is controlled. With regard to controlling the driven vibration, if the displacement amplitude of the driven vibration is held constant, the characteristic curves can appear similar to those depicted in FIG. 6. However, if the driven velocity is instead held constant, the characteristic curves in FIG. 6 are shifted by N=1 domain. (This pertains to amplitude related signals only since measuring time delay or phase automatically compensates for driven amplitude.) While a Coriolis mass flow meter designer has some theoretical freedom to adjust the design and the working domain to try to minimize or eliminate sensitivity changes on the meter, this freedom may be quite difficult to realize in practice.

FIG. 6 depicts why it is so difficult to individually measure and compensate for every parameter that can effect the sensitivity of a given flow meter design. Since it is very difficult and restrictive from a designer's standpoint to create a flow meter design that minimizes all these effects in a given domain, it is understood that the ability to measure and compensate for the total combined effects of all these parameters in any working domain would be of tremendous value to the industry. This is the object of the present invention.

Typically, the flow-related distortions shown in FIG. 2 of the vibrating surface 1 are measured in a prescribed domain, for example the velocity domain, since the most commonly-employed motion detectors on these devices are magnets and coils that produce signals proportional to relative velocity between the magnetic field and its associated coil. The motion detectors in combination with circuit 10 therefore produce a signal that is proportional to these flow-related distortions in the velocity or some other domain.

The flow-related signal is proportional to mass flow rate multiplied by the sensitivity, that, in turn, is dependent upon the selected signal domain and the combined effect of vibrating surface, ambient, and fluid-related parameters, such as temperature, elasticity, material damping in the vibrating surface, pressure, density, viscosity or stress in the vibrating surface 1. In addition, the flow-related signal is often offset by some value relating to an innate zero offset of the device. As stated previously, a primary object of the present invention is to determine and compensate for any changes in the response characteristic.

To determine the sensitivity, the present invention makes use of equations (1) through (8) above. The angular rotation vector $\Omega_{cor}$ can be determined from the geometry of the design, and the driven vibration amplitude and frequency of the vibrating surface 1 (that is typically controlled or measured by a drive circuit 8 of FIG. 3). This relationship is defined in equation (6) above. Therefore, for a given geometry and vibration amplitude and frequency, the resulting Coriolis force that results from a given flow rate is mathematically determined through equation (8). However, this force can only be measured indirectly by measuring the distortional effects of the force on the vibrating surface 1.

By determining the frequency response of vibrating surface 1, the sensitivity and zero can be determined and compensated for any changes therein. The preferred method of determining this frequency response is by the use of a prescribed reference excitation.

By exciting the vibrating surface 1 with a prescribed reference excitation force and then measuring the response to that force, the net sensitivity and zero can be determined and any changes compensated for regardless of the causes of those changes. The prescribed excitation force is in addition to the forces necessary to maintain the normal driven vibration of vibrating surface 1 as shown in FIG. 1.

A prescribed reference excitation force is therefore applied to the vibrating surface 1. Several embodiments are hereinafter described for achieving the application of the additional excitation force, including the use of current brakes mounted in conjunction with the vibrating surface that can be switched on or off as required, auxiliary magnets and coils mounted in association with the vibrating surface that can be activated in a prescribed manner to modulate the mass flow-related signal, variable impedance components associated with the motion sensors, the addition of excitation signals to the drive signals that maintain the driven vibration of vibrating surface 1, piezoelectric exciters and others.

Another method described involves exciting a Coriolis reaction mode of vibration on vibrating surface 1 (similar to FIG. 2) to determine its frequency response characteristics and then calculating the response at the driven vibration frequency.

Any of these excitations can be applied continuously or intermittently as required for a given design. In addition, the excitation can be applied plurally both upstream and downstream, or singularly either upstream or downstream. These methods have different effects and can be used to separately determine both the effects on sensitivity and on zero.

Once the prescribed excitation has been applied, the response is then measured by one of several methods described including measuring the magnitude of the distortion of surface 1 due to the reference excitation, observing the modulating effect of the prescribed excitation on the mass flow-related signal, calculating a frequency response by methods including a Fourier transform (fast or discrete), and others.

With the excitation and the response thereby determined, the mathematical relationships between them yield the desired measurement parameters for the device that include the response characteristic (including sensitivity and zero). Sensitivity and zero compensation values are thereby determined and applied to the mass flow-related signal to correct that signal for any changes therein.

As previously mentioned, an important area in the flow measurement industry is that of field proving flow measurement devices to determine any shifts in the sensitivity of the meter. Since the present invention further addresses the issue on Coriolis flow meters, it directly follows that the apparatus and methods herein described can be applied to that end.

The act of field proving a flow meter normally involves creating a reference flow rate through the meter and measuring the meter's response to that reference flow rate. The sensitivity and/or zero of the meter is then determined (by dividing meter output by a reference flow rate) and compared to previously-determined values of those numbers to determine if there has been any change therein.

The key to the prior art procedure is providing the reference flow rate, normally involving an additional piece of equipment designed to provide a highly accurate measure of flow rate such as those previously mentioned. The additional equipment often requires costly and time-consuming setup and operational efforts.

A unique aspect of a Coriolis flow meter is, as previously mentioned, the fact that the Coriolis force that results from a given flow rate is easily determined through equation (8), above. This force, or one proportionally related thereto, can therefore be applied onto the vibrating surface 1 simulating that same force (or one proportionally related thereto) that results from an actual reference fluid flow rate. Therefore, applying the force is analogous to creating a reference flow rate through the meter and thus can be made to serve the same purpose as that of a field prover.

Therefore, by applying a prescribed excitation force proportionally related to the force that results from a given mass flow rate, and by monitoring the mass flow-related output signal change therefrom, the response characteristics of the device can thereby be determined and compared to those taken at previous times and conditions for comparison for any changes therein. From this, an output signal can be created proportionally related to the sensitivity and/or zero of the flow meter. The method can be used in lieu of any additional equipment, and can be actuated periodically or continuously, as required in a particular application.

The Signal Processing Aspect of the Present Invention

The detailed description of a first embodiment of the signal processing aspects of the present invention is better understood when taken in conjunction with FIGS. 1 through 6.

Referring again to FIGS. 1 and 6, illustrated is a section of a vibrating surface of a Coriolis mass flow meter shown deflected in its driven mode of vibration, along with the moving fluid with which it interacts. As previously mentioned, the present invention applies to all Coriolis type flow meters, whether they use internal flow through a flow conduit, external flow over a conduit or flow adjacent to an arbitrary surface. For the purposes of this discussion, a vibrating surface (such as the vibrating surface 1 of FIG. 1) will therefore be used and be taken to represent a vibrating tube or conduit or surface in any type of Coriolis mass flow meter.

The vibrating surface 1 therefore represents a vibrating surface of a Coriolis flow meter that interacts with the moving fluid 2, the flow rate of which is to be measured. The sensitivity dependency of vibrating surface 1 to various fluid effects are, for this example, represented by the characteristic curves of FIG. 6. The vibrating surface 1 is caused to vibrate by forces applied by a vibration driver 3, that is typically a magnet and coil arrangement electrically excited at a prescribed amplitude, frequency and phase by a circuit 8, to cause the requisite vibration that is typically a natural mode of vibration of the vibrating surface 1 (driven mode). FIG. 1 therefore depicts the vibrating surface 1 deflected during its driven natural mode of vibration. The resulting vibration of the vibrating surface 1 is designed to interact with a moving fluid 2 so as to cause a Coriolis force distribution to bear upon the vibrating surface 1 thus, in turn, causing physical distortions in the vibrating surface 1 proportionally related to the mass flow rate of the moving fluid 2.

Turning now to FIGS. 2 though 4, illustrated are (in FIG. 2) the vibrating surface of FIG. 1 shown deflected due to the Coriolis force distribution that results from movement of the moving fluid 2, (in FIG. 3) a signal processing and field proving circuit of one embodiment of the present invention and (in FIG. 4) an illustration of electrical signals that occur in conjunction with various embodiments of the present invention. It is the magnitude of the deflection illustrated in FIG. 2 that is proportionally related to the mass flow rate, however this magnitude is modified by fluid parameters, thereby affecting the sensitivity of the device. It should be noted that the forced vibration mode shape of FIG. 1 and the resulting Coriolis distortion shape of FIG. 2 are examples of those commonly used in Coriolis flow meters today. Many other modes of vibration involving higher order modes are possible. Therefore, the exact mode of vibration chosen is immaterial to this discussion, since the general principle applies to all types of forced vibration modes and their corresponding Coriolis distortion shapes.

Two motion sensors 4, 5 are preferably coupled to the vibrating surface 1 to sense the physical motions in the vibrating surface 1 at two different places along the length of the vibrating surface 1, and thereby create motion signals 11 and 12 (FIG. 4) respectively related to the motions sensed by the two sensors 4, 5. The two sensors 4, 5 are preferably magnet and coil pairs, whereby they measure velocity. However they could be any other type of sensor responsive to motion such as displacement transducers, accelerometers, electrostatic sensors, optical sensors, optic fibers or strain gages. The sensor 4 is shown deployed toward the upstream direction of the vibrating surface 1, and the sensor 5 is shown deployed toward the downstream direction of the vibrating surface 1. The two sensors 4, 5 are deployed at different places along the vibrating surface 1 so that there is a difference sensed between the two sensors 4, 5 proportionally related to mass flow rate. In this embodiment the difference is used for the determination of an uncompensated (or "raw") mass flow-related signal 9 ($M'_{raw}$ signal 9) by one of several methods employed in a circuit 10.

It should be noted that certain designs of Coriolis mass flow meters can employ a single motion sensor to determine the $M'_{raw}$ signal 9. This is the case for a vibrating surface that is designed to create a Coriolis force distribution and a resulting distorted shape that is best sensed at a single position. Therefore, it is anticipated that the present invention can be used with a single motion sensor, however two are used in the preferred embodiment. As an example of this idea, if the distorted shape in FIG. 2 were used for the driven mode shape, the Coriolis reaction mode shape would be the next higher mode shape that could easily be sensed with a single motion detector located in the center of surface 1 near that depicted by driver 3 of FIG. 2.

The preferred method employed in the circuit 10 to determine the $M'_{raw}$ signal 9 is to measure the AC component of the difference between signals 11, 12 synchronously demodulated in phase with the Coriolis forces. The signal therefore represents the $M'_{raw}$ signal 9 in the velocity domain 27, modified by any changes in the sensitivity or zero as previously described.

Alternatively, another method commonly employed in the circuit 10 to determine the $M'_{raw}$ signal 9 is to measure the time delay between the signals 11, 12 from the motions sensed at the sensors 4, 5. The time delay represents a raw mass flow-related signal in the time delay domain 25, modified by any changes in the sensitivity or zero as previously described.

Other methods of determining the raw mass flow-related signal include using Fourier transform methods to determine the phase angle between the signals 11, 12 of the sensors 4, 5, either by fast or discrete methods. The phase angle represents a raw mass flow-related signal in the phase (or displacement) domain 26, modified by any changes in the sensitivity or zero as previously described.

The $M'_{raw}$ signal 9 used in the velocity domain 27, as shown in FIG. 6, has a small sensitivity dependency upon vibrating surface 1 elastic modulus changes (illustrated by the characteristic curve 31). However, the $M'_{raw}$ signal 9 has relatively large sensitivity dependencies upon pressure (illustrated by the characteristic curve 29) and density (illustrated by the characteristic curve 30) and vibrating surface 1 stress changes (illustrated by the characteristic curve 32). This is the point where traditional signal processing methods apply individual compensations for each parameter according to their characteristic individual effects (e.g., temperature compensation using temperature sensor or strain compensation using strain gages) or by changing the domain of the acquired signal (e.g. from the velocity to the displacement or time delay domain).

In the present invention, however, the response characteristics of overall sensitivity and zero are determined by applying a prescribed reference excitation or excitations to the vibrating surface and by measuring the response thereof. This allows the signals to be acquired and processed in any signal domain in which the designer may choose to work, regardless of the sensitivity dependencies that correspond to that domain.

Reference exciters 6, 7 are preferably deployed in association with vibrating surface 1 at two different positions thereon. The reference exciters 6, 7 are preferably magnet and coil pairs designed to apply a prescribed force upon the vibrating surface 1 at a prescribed amplitude, frequency and phase supplied by exciter drivers 13, 14 of FIG. 3, respectively. In this embodiment, the reference exciters 6, 7 are located along the vibrating surface 1 where their forces best simulate the net distributed Coriolis force that occurs along the vibrating surface 1 due to the motion of the moving fluid 2 interacting with the forced vibration of the vibrating surface 1.

Figure 4:
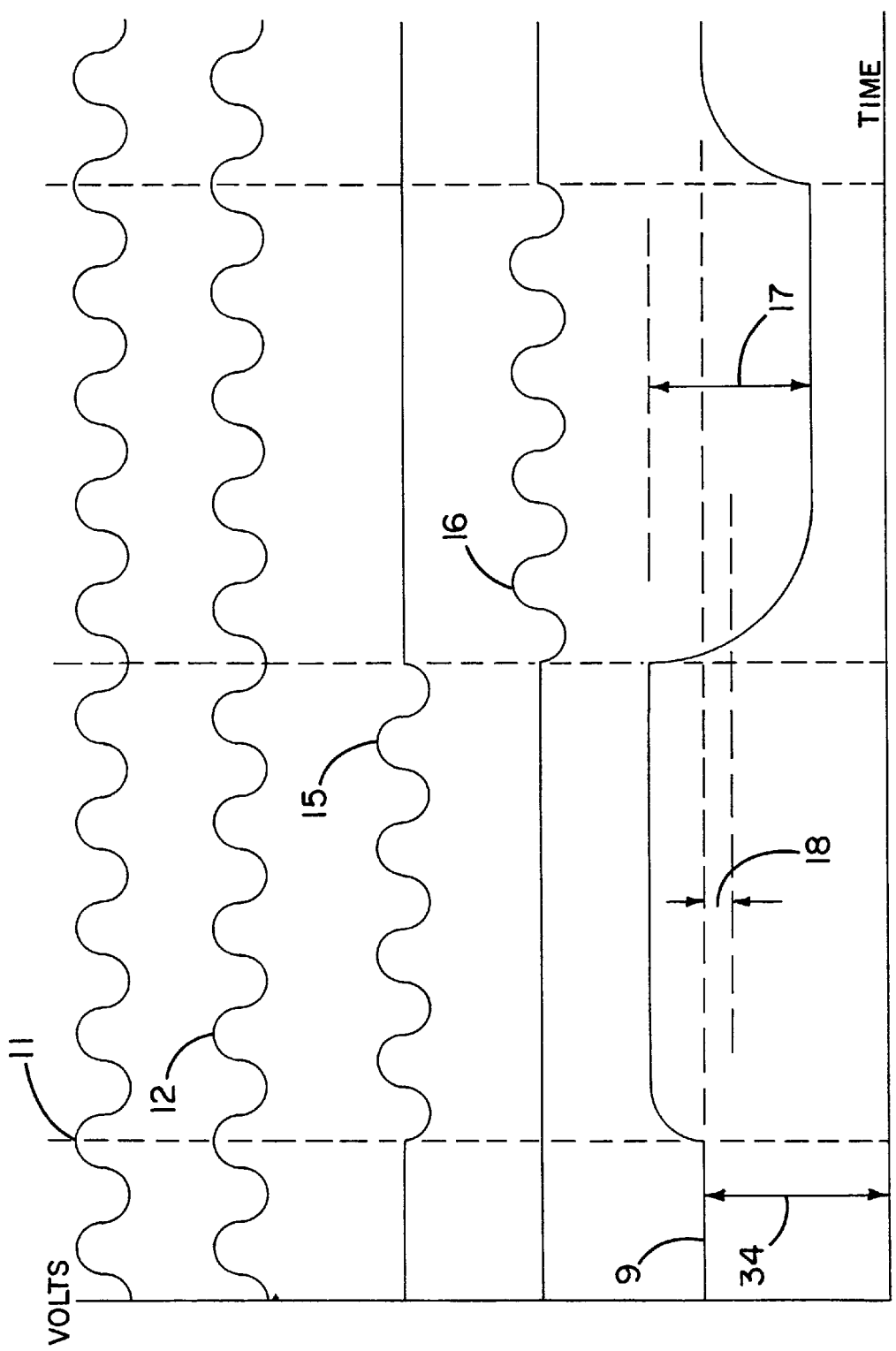
FIG. 4 illustrates electrical signals that occur in conjunction with various embodiments of the present invention.

The reference excitation to be applied can be of any prescribed magnitude, but are preferably proportionally related to the driven motion of the vibrating surface 1 (and therefore proportional to the magnitude of the signals 11, 12) by the exciter drivers 13, 14 respectively. By using excitation proportionally related to the driven motion of the vibrating surface 1, driven amplitude dependency of the resultant flow signals is automatically compensated for. Excitation signals 15, 16 are thereby determined and applied to reference exciters 6, 7, respectively, in an alternating fashion as shown in FIG. 4. The reference excitation signals 15, 16 are preferably applied in the same phase relationship as is the Coriolis-related flow signals, that themselves are typically in phase with the velocity-related signals 11, 12. It should be noted here that any arbitrary phase relationship could here be used to apply the reference excitation, however, the signal processing circuitry is normally designed to detect signals in phase with the Coriolis forces, therefore it is a practical convenience to apply these reference excitations in this phase and thereby detect their effects as modulations on the flow-related signals.

First, the excitation signal 15 is applied to the reference exciter 6 for a period of time (termed a "modulation period") as necessary to determine its effect on the $M'_{raw}$ signal 9. Next, the excitation signal 15 is terminated and the excitation signal 16 applied to reference exciter 7 for a modulation period as necessary to determine its effect on the $M'_{raw}$ signal 9. The polarity of the excitation signals 15, 16 is preferably applied to produce the opposite effect on the $M'_{raw}$ signal 9 (i.e., the signal 15 causes a positive effect and the signal 16 causes a negative effect, or vice versa) as shown in the $M'_{raw}$ signal 9 of FIG. 4. The logic and timing of the reference excitations are controlled by reference exciter logic circuitry 19.

A circuit 20 then receives the modulated $M'_{raw}$ signal 9 and excitation information from the reference exciter circuitry 19 and thereby determines a "nominal" value 34 (a value without any reference excitation), a modulation amplitude 17, and a modulation offset 18 (a difference between the average modulation value and the nominal value of signal 9 with no reference excitation applied). It should be noted that the modulation of the $M'_{raw}$ signal 9, in this case, causes deviation from the nominal value 34 that can be attributable to a zero flow condition or some finite amount of flow. The accurate determination of the sensitivity and zero is preferably accomplished during a period of time when the nominal value 34 of signal 9 does not change significantly over the modulation period.

The response characteristics then are determined as follows. The modulation amplitude 17 is proportionally related to the sensitivity of the vibrating surface 1 regardless of the cause of any changes therein, and is therefore proportionally related to the sensitivity of the device at that moment. In contrast, the modulation offset 18 is proportionally related to the attenuation of one end of the vibrating surface 1 with respect to the other end of the vibrating surface 1 and is therefore indicative of a zero offset. Thus, the modulation offset 18 is proportionally related to the zero of the device at that moment.

The modulation amplitude 17 and offset 18, along with excitation information, are then supplied to a circuit 21. The circuit 21 also receives the modulated $M'_{raw}$ signal 9 and transforms the $M'_{raw}$ signal 9 into a true mass flow signal ($M'_{true}$ signal 22) corrected for any changes in the sensitivity or zero offset. The $M'_{true}$ signal 22 additionally can be demodulated to remove unwanted modulations prior to delivery to the user. One such correction method is as shown in relation (14) below.

$$M'_{true} \, \alpha (\text{nominal value} + \text{zero offset})/(\text{modulation amplitude}) \quad (14)$$

The preferred method of measuring the modulation amplitude 17 in the circuit 20 is to demodulate the $M'_{raw}$ signal 9 synchronously using the modulation period determined from the reference exciter circuitry 19 as the synchronous reference. This can be done using a lock-in amplifier or its equivalent in a digital processor. Alternate methods include a precision root mean square ("RMS") circuit or peak detection methods.

In addition, the modulation can be done intermittently or continuously as preferred by the designer. However, if done continuously, the modulation offset 18 is lost, since the excitation is not turned off to allow the $M'_{raw}$ signal 9 to return to a nominal value. Continuous modulation however can be used effectively.

Figure 7:
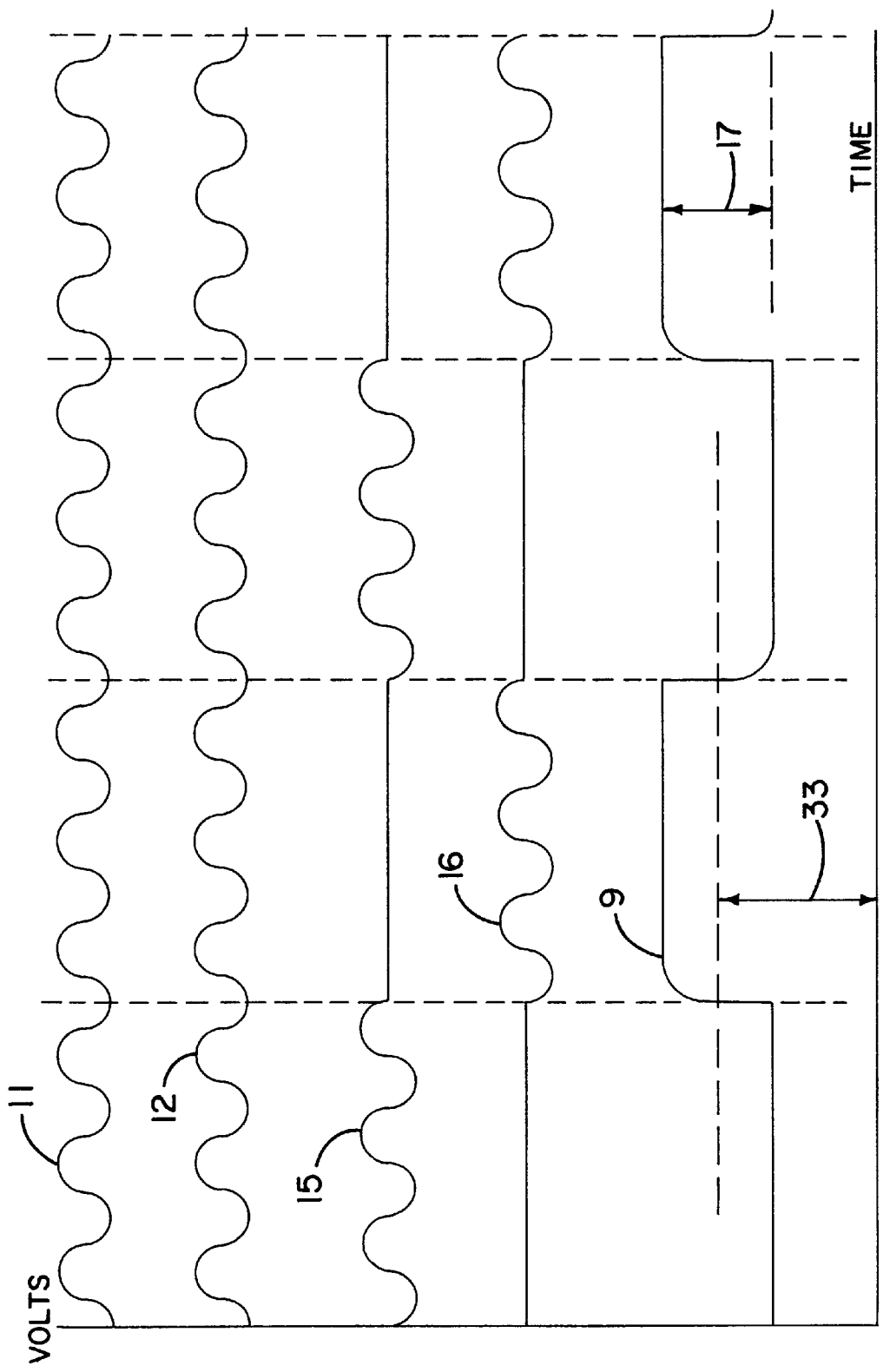
FIG. 7 illustrates electrical signals that occur in conjunction with various embodiments of the present invention.

Turning now to FIG. 7, illustrated are electrical signals that occur in conjunction with various embodiments of the present invention. The reference exciter circuitry 19 of FIG. 3 controls continuous reference excitation alternating between the exciters 6, 7 via the signals 15, 16, respectively, as shown in FIG. 7. The result is a continuously-modulated signal 9 as shown in FIG. 7. Here, the average modulated value 33 is proportionally related to the $M'_{raw}$ signal 9, with the zero offset value removed, and the modulation amplitude 17 is proportional to the sensitivity. Therefore, the true mass flow rate signal is achieved in this example by dividing the average modulated value 33 by the modulation amplitude 17 as in relation (15) below.

$$M'_{true} \, \alpha (\text{average modulated value})/(\text{modulation amplitude}) \quad (15)$$

In this way, if, at a constant flow rate, the sensitivity of the vibrating surface 1 increases (perhaps due to a change in the pressure, density, viscosity, temperature or driven amplitude), the average modulated value 33 also increases. The modulated amplitude 17 also increases, thereby holding the final $M'_{true}$ signal to be constant (as was the mass flow rate for this example).

Since it may be preferable not to have modulation on the $M'_{true}$ signal 22, several methods are anticipated to remove the modulation prior to delivery of the $M'_{true}$ signal 22 to the user. Some of these methods include holding the last value of the $M'_{true}$ signal 22 determined prior to modulation through the modulation sequence, and then resuming the $M'_{true}$ signal 22 with updated sensitivity and zero offset compensation values. Another method is synchronously to add ½ of the modulated amplitude 17 value back onto the $M'_{raw}$ signal 9 alternately in the correct phase and polarity to effectively demodulate the signal and rid the $M'_{raw}$ signal 9 of unwanted modulations.

As an alternate to the first embodiment wherein the excitation signals 15, 16 are created and actively applied to the reference exciters 6, 7 respectively, dampers can be used to create the reference excitation forces proportionally related to the rotational velocity of the vibrating surface 1 and thereby simulate Coriolis forces being applied. Dampers are devices that create forces proportionally related to velocity, that is analogous to the Coriolis forces themselves as previously explained in conjunction with equations (1)

through (6) above. Therefore, the reference exciters 6, 7 can be used as dampers that can be turned on or off as necessary to accomplish reference excitation.

Figure 3:
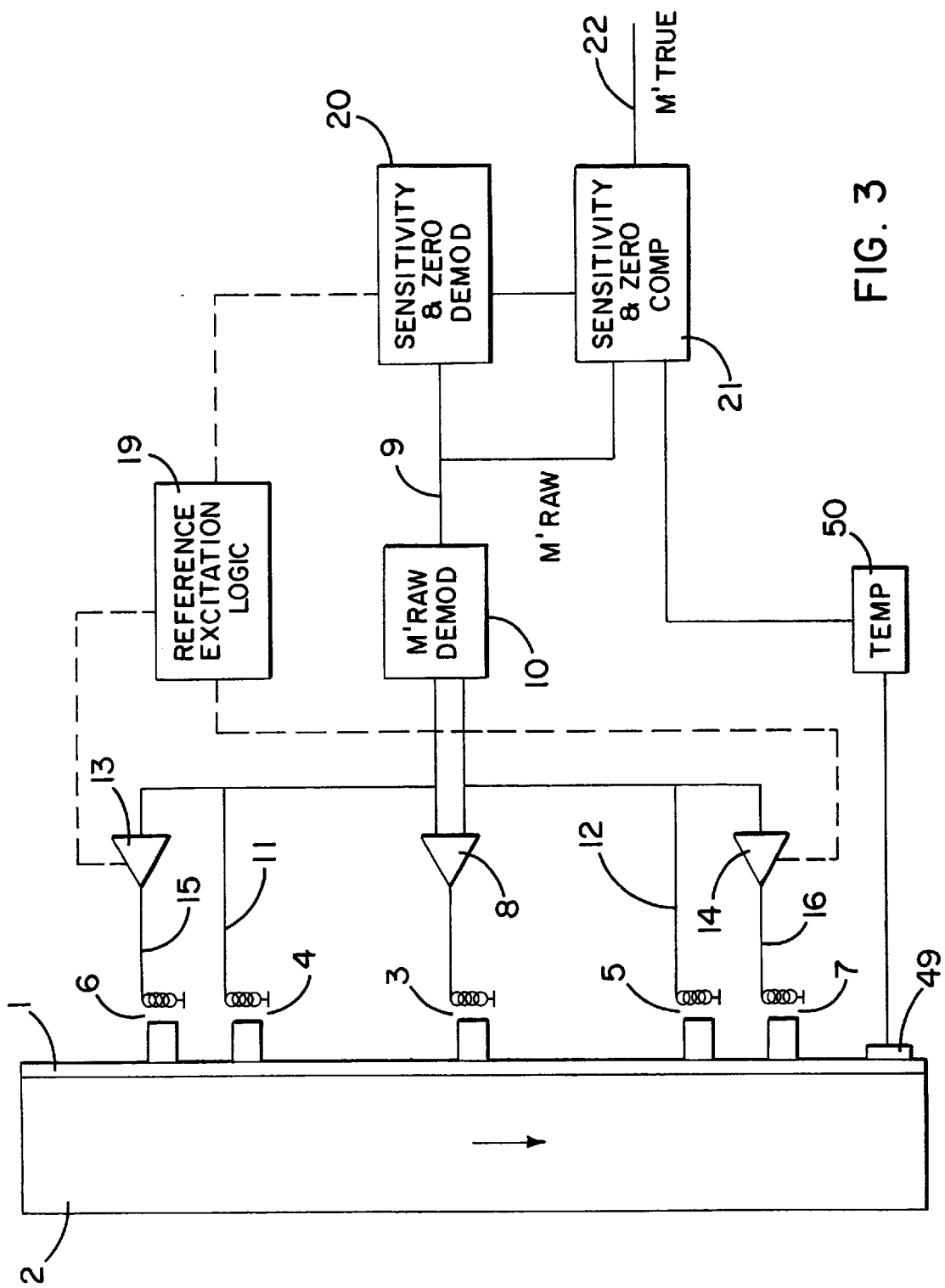
FIG. 3 illustrates a signal processing and field proving circuit of one embodiment of the present invention.
Figure 5:
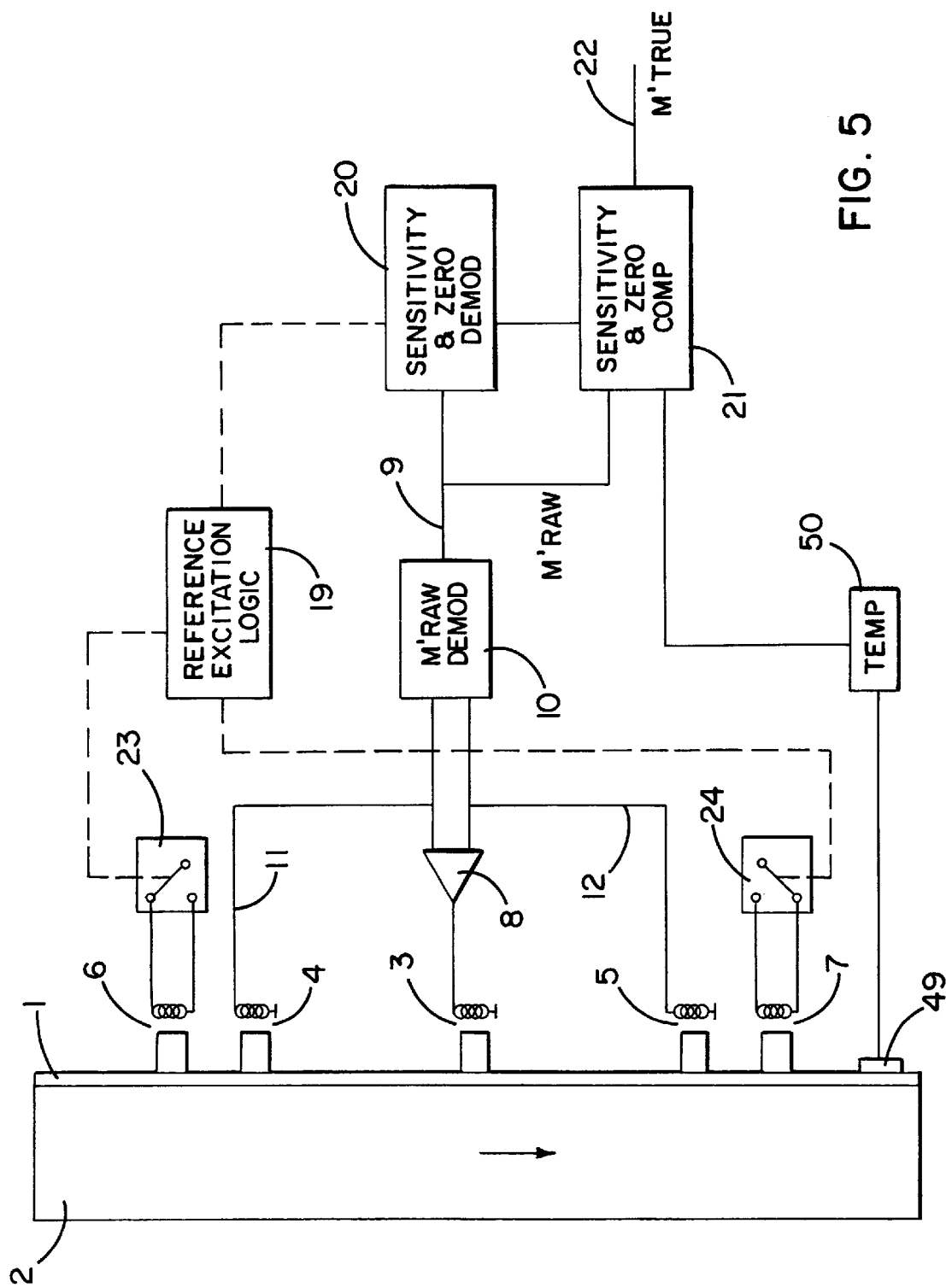
FIG. 5 illustrates an electrical circuit that could be used as an alternate to that shown in FIG. 3.

Turning now to FIG. 5, illustrated is an electrical circuit that could be used as an alternate to that shown in FIG. 3. Damping is accomplished by using the circuit of FIG. 5 wherein the reference exciter circuits 13, 14 of FIG. 3 are replaced by switches 23, 24. When these switches 23, 24 are activated, the coil portion of the reference exciters 6, 7 then become "shorted," allowing current to flow through the loop thus created in conjunction with the motion of the vibrating surface 1. The current then repels the magnetic fields in the exciters 6, 7, thereby creating forces proportionally related to the velocity of the vibrating surface 1 and analogous to Coriolis forces. This is similar to a current brake (another type of damper that could be used). Many other types of dampers are known to those of ordinary skill in the pertinent art and also fall within the broad scope of the present invention.

The motion of the vibrating surface 1 from the driven vibration creates a voltage on the coils of the reference exciters 6, 7 if the switches 23, 24 are held in their open positions by the reference exciter circuitry 19 of FIG. 5. To modulate the $M'_{raw}$ signal 9 as before, the reference exciter circuitry 19 first closes the switch 23 for a period of time (again, the "modulation period"). Closure of the switch 23 then creates a current brake, whereby the aforementioned voltage is converted into a current that then repels the magnetic field portion of the exciter 6. This creates a force proportionally related to the velocity of the vibrating surface 1. Since the velocity is related to the rotational velocity of the vibrating surface 1 through its geometry and driven amplitude and frequency (as previously mentioned), the force is therefore proportionally related to the rotational velocity of the moving fluid 2 interacting with the vibrating surface 1 and thereby proportionally related to the Coriolis force that is created from a prescribed flow of the fluid 2.

The braking force then has the same effect as in the previous embodiment and causes a change in the magnitude of the distortion of surface 1, and can thus be measured as a change in the level of the $M'_{raw}$ signal 9. Next, the reference excitation circuitry 19 opens the switch 23 and closes the switch 24 for a period of time that, again, has the same effect as previously mentioned and causes a force proportionally related to the rotational velocity of the vibrating surface 1 to be applied to the vibrating surface 1 through the reference exciter 7, thereby simulating a prescribed amount of flow of the fluid 2.

The second force from the reference exciter 7 causes a similar change in the level of the $M'_{raw}$ signal 9, but in the opposite direction as did the force from the exciter 6, similar to the previous embodiment. Therefore, similar to the previous example, the $M'_{raw}$ signal 9 of FIG. 4 depicts the modulation that occurs due to these applied braking forces. These modulations again have a modulation amplitude 17 and a modulation offset 18 that are proportionally related to the sensitivity and the zero. The circuit 20 then determines these values and thereby the values of the sensitivity and the value of the zero and passes the information on to the circuit 21, where the appropriate compensation values are applied to the $M'_{raw}$ signal 9 to correct for any changes in the sensitivity or the zero. Also, the $M'_{raw}$ signal 9 may be demodulated to remove the excitation modulation prior to creating and delivering the final $M'_{true}$ signal 22 to the user.

With regard to the design of the current braking system, the amount of force that the system creates, and therefore the amount of mass flow this force represents, is dependent upon the force per unit velocity that the system is designed to deliver. Therefore, the force is dependent upon the velocity of the vibrating surface 1 as mentioned, the magnetic field of the exciter 6 and the length and conductivity of the conductor that is placed in the magnetic field (whose values are preferably held to be constant). Since current brake designs are well understood, it is not necessary to elaborate the point, except that the design should accommodate changes in temperature while still producing forces representing the motion of the vibrating surface 1. Some trade names of conductors that do not appreciably change conductivity as a function of temperature include CUPRON®, EVANOHM® and MANGANIN®, with MANGANIN® being the preferred type. For providing the magnetic field, the use of a permanent magnet made of ALNICO-9 is most preferable, because of its superior performance over changes in temperature, but ALNICO-8 is a viable alternative, as are samarium cobalt and other similar conventional materials.

Because temperature is principally the only parameter that affects the magnetic fields or the conductivity of the wires used in the motion sensors 4, 5, or the reference exciters 6, 7, and since temperature measurement is relatively easy to implement, a temperature sensor 49 and a temperature compensation circuit 50 can be added as an alternative or addition to using magnets and wire that do not appreciably change as a function of temperature (FIGS. 3 and 5).

As an alternate to using separate reference exciters 6, 7, the functionality of reference exciters can be effectively included in the motion sensors 4, 5 by one of several methods. One method of incorporating the functionality of reference exciters within the motion sensors 4, 5 is simply to wind separate turns of wire on the coils of the motion sensors 4, 5 and connect those turns to the circuits 13, 14, respectively, of FIG. 3, or to the circuits 23, 24, respectively, of FIG. 5, as before. This simply eliminates the need to place extra magnets on the vibrating surface 1, thereby simplifying geometry.

Figure 10:
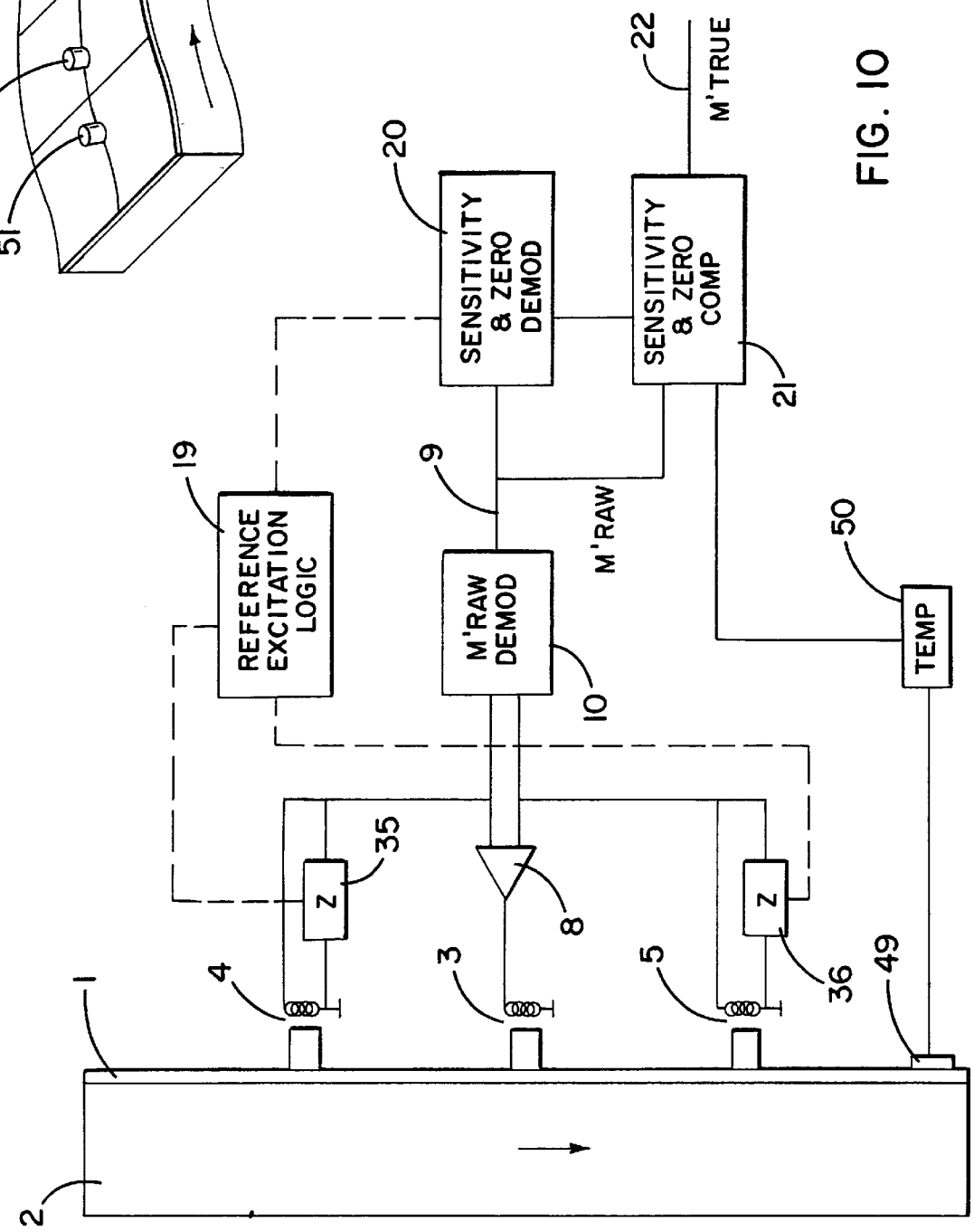
FIG. 10 is an alternate circuit diagram that could be used for the present invention using variable impedances.

Turning now to FIG. 10, illustrated is circuit diagram of an alternate embodiment of the present invention that uses variable impedances. Another method to incorporate the functionality of reference exciters into the motion sensors 4, 5 is to couple variable impedances 35, 36 to the coils of the motion sensors 4, 5. These variable impedances are then controlled in the same way as were the circuits 13, 14 of FIG. 3 or the switches 23, 24 of FIG. 5, via the reference excitation circuitry 19. By changing the impedance across the coil of the motion sensor 4 via the variable impedance 35, the amount of current passing through the coil changes, thereby changing its braking effect and representing a prescribed amount of force and thus of fluid flow. Similarly, the variable impedance 36 can therefore be used to have a similar effect on the coil of the motion sensor 5. Therefore, by alternately changing the impedance of the circuits 35, 36 over some modulation period, forces are created that modulate the $M'_{raw}$ signal 9 as described in previous embodiments. By measuring these modulations on the $M'_{raw}$ signal 9, the changes in the sensitivity or zero offsets can be determined and compensated for.

As an alternative to having a separate vibration driver and reference exciters, the functionality of reference exciters can be incorporated into the vibration driver that causes the requisite driven vibration of the vibrating surface 1.

Turning now to FIGS. 8 through 14, illustrated are (in FIG. 8) characteristic frequency response curves of the driven mode of vibration and the Coriolis mode of vibration, (in FIG. 9) a section of a vibrating surface of a Coriolis mass flow meter along with the moving fluid with which it interacts, (in FIG. 10) an alternate circuit diagram that could be used for the present invention using variable impedances, (in FIG. 11) a circuit diagram that could be used for the present invention using combined vibration drivers and reference exciters, (in FIG. 12) electrical signals that occur in conjunction with various embodiments of the present invention, (in FIG. 13) electrical signals that occur in conjunction with various embodiments of the present invention and (in FIG. 14) an alternate circuit diagram that could be used for the present invention using alternate reference excitation methods.

Figure 9:
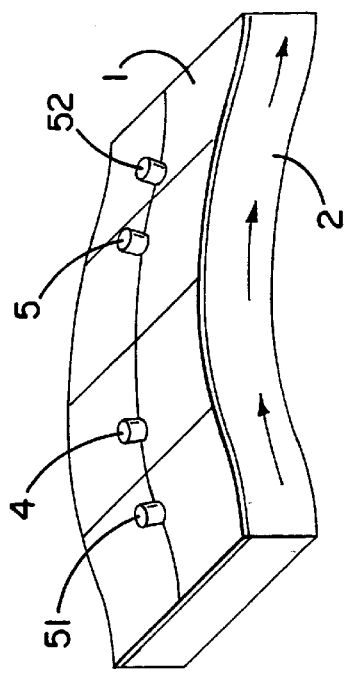
FIG. 9 illustrates a section of a vibrating surface of a Coriolis mass flow meter along with the moving fluid with which it interacts.
Figure 11:
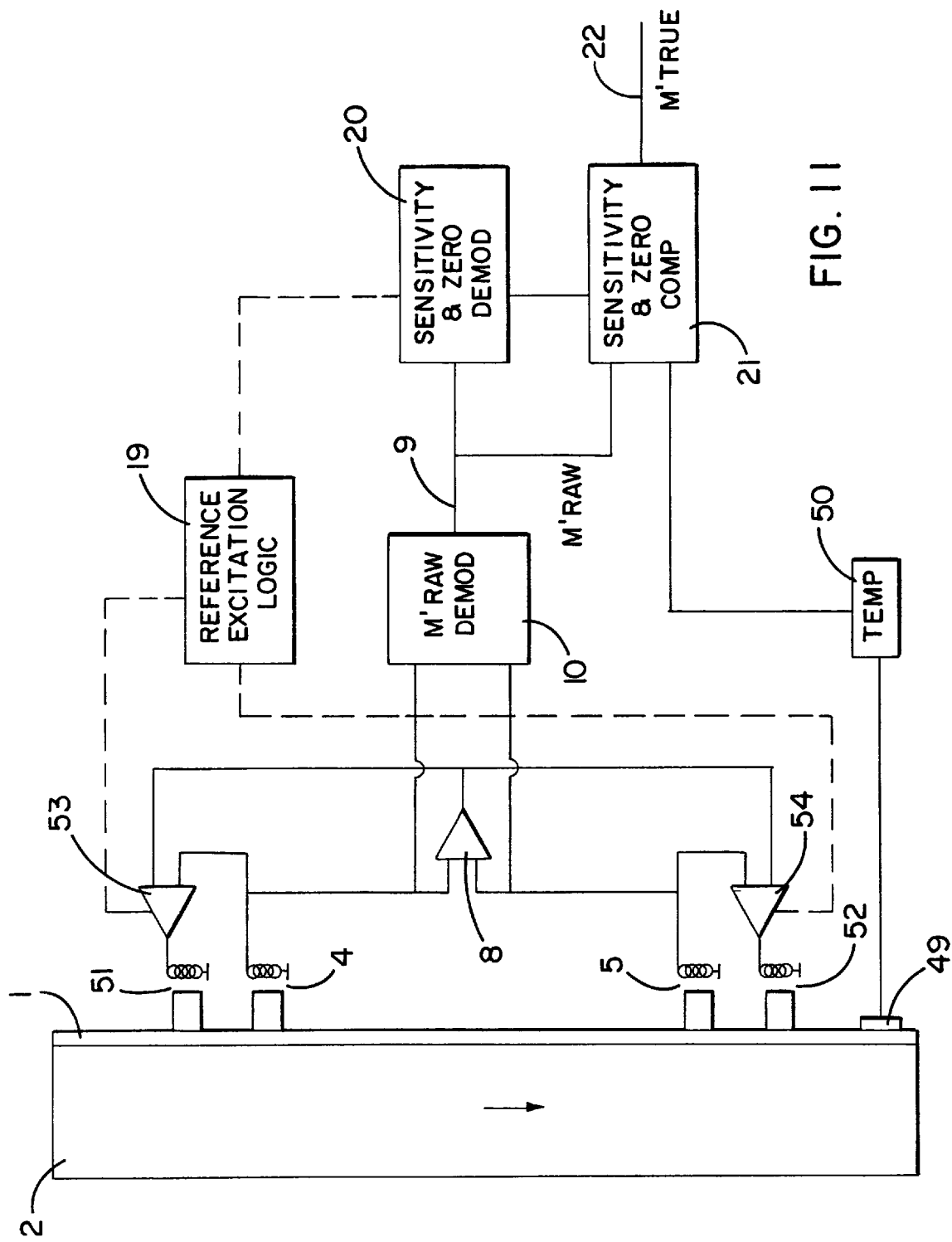
FIG. 11 is an alternate circuit diagram that could be used for the present invention using combined vibration drivers and reference exciters.

The motion sensors 4, 5 of FIG. 9 have the same functionality as in previous embodiments, that is, to sense the vibration of the vibrating surface 1. Vibration drivers 51, 52 are combined vibration drivers and reference exciters that are mounted on the vibrating surface 1 and located to supply both of these functions from their respective locations. The vibration drivers 51, 52 therefore need to be coupled to the vibrating surface 1 where they can impart energy into both the desired driven vibration motion and also into the Coriolis deflected motion. Preferably, the vibration drivers 51, 52 are magnet/coil pairs as previously described, but could also be any other type of force transducer. The circuit of FIG. 11 is then used in conjunction with the embodiment of FIG. 9. A drive circuit 8 (of FIG. 11) serves the same functionality as in previous embodiments by receiving motion signals from the motion sensors 4, 5, and creating drive signals as necessary to maintain the driven vibration of the vibrating surface 1 in accordance with design parameters. Drive signals thus created are transmitted to the circuits 53, 54 that receive those drive signals and pass a selected amount of those signals on to the vibration drivers 51, 52 in the appropriate phase and amplitude to maintain the driven vibration. In addition to receiving the drive signal from the circuit 8, the circuits 53, 54 also receive signals individually from the motion sensors 4, 5, and can (when directed to do so by the reference excitation circuitry 19) also add a reference excitation signal that is of appropriate amplitude (and typically in phase with the driven motion) to simulate the Coriolis force of a prescribed amount of fluid flow rate.

The reference excitation circuitry 19 first activates the circuit 53 to sum the drive signal with the reference excitation signal and apply the combination to the vibration driver 51 for a period of time (modulation period). At the same time, the reference excitation circuitry 19 prevents the circuit 54 from summing the drive signal with the reference excitation signal and only allow the drive signal to pass through to the vibration driver 52. A simulated Coriolis force is then applied only to the upstream end of the vibrating surface 1 through the vibration driver 51 and thereby causes the $M'_{raw}$ signal 9 to change in response to the applied simulated Coriolis force as shown in FIG. 4.

Next, the reference excitation circuitry 19 activates the circuit 54 to sum the drive signal with the reference excitation signal and apply the combination to the vibration driver 52 for a period of time (modulation period). At the same time, the reference excitation circuitry 19 prevents the circuit 53 from summing the drive signal with the reference excitation signal and only allow the drive signal to pass through to the vibration driver 51. A simulated Coriolis force is then applied only to the downstream end of the vibrating surface 1 through the vibration driver 52 and thereby causes the $M'_{raw}$ signal 9 to change in response to the applied simulated Coriolis force, but in the opposite polarity, as shown in FIG. 4. Analogous to the previous embodiments, the $M'_{raw}$ signal 9 is thereby modulated first in a positive sense and secondly in a negative sense as shown in FIG. 4, the magnitude of modulation 17, and the deviation 18 from the average value 34 are respectively related to the sensitivity and the zero offset of the device at that moment. The circuit 20 of FIG. 11 then performs the same function as previously by determining these values 17, 18, 34 and passes the information on to the circuit 21 that applies the appropriate compensation for any changes in the sensitivity and zero offsets, and demodulates the $M'_{raw}$ signal 9 into an unmodulated $M'_{true}$ signal 22.

Analogous to the modulation methods described for earlier embodiments, this embodiment can also be modulated on a continuous basis instead of intermittently. By modulating continuously, the unmodulated value 34 is lost; however, compensation for the zero offset is accommodated automatically by using the average modulated value 33 and the modulation amplitude value 17 analogous to that described for FIG. 7.

As an alternate to applying the reference excitation forces serially first to the upstream vibration driver then to the downstream vibration driver, these forces can be applied in parallel to both vibration drivers at the same time. This is preferably accomplished in the following way with reference to the embodiment of FIG. 9 and the circuit of FIG. 11, although those of ordinary skill in the pertinent art should note that this alternate modulation method applies to most of the other embodiments as well.

First, the reference excitation circuitry 19 preferably has the same functionality as in previous embodiments and controls the application of reference excitation signals to the vibration drivers. The reference exciter circuitry 19 therefore directs the circuits 53, 54 to simultaneously apply both drive forces and reference excitation forces to the vibrating surface 1 to simulate a prescribed amount of fluid flow. Accordingly, the circuit 53 of FIG. 11 receives two inputs: the drive signal applied to both vibration drivers from the circuit 8 and input from the motion sensor 4. The circuit 53 uses the input from motion sensor 4 to determine the appropriate reference excitation signal (55 of FIG. 12) that should be applied to the vibration driver 51. The excitation is typically a signal proportionally related to the amplitude of the motion sensed by the motion sensor 4, and in phase with the Coriolis forces (in phase with the driven velocity). The reference excitation signal 55, once determined, is then summed with the drive signal from the circuit 8 within the circuit 53 and delivered to the vibration driver 51. The summed signal then serves both the purpose of maintaining the requisite vibration of the vibrating surface 1 and applying the reference excitation as well.

Figure 12:
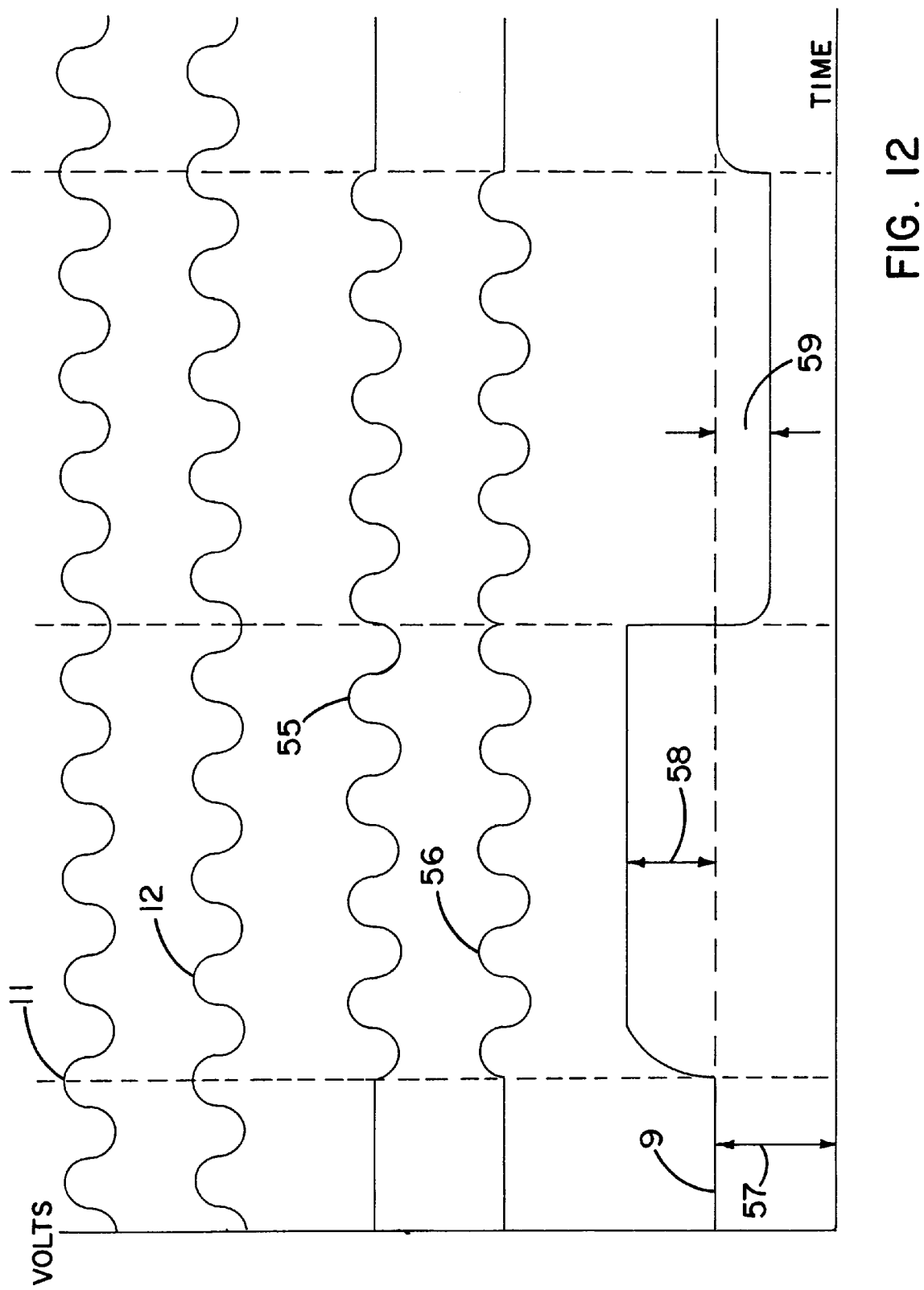
FIG. 12 illustrates electrical signals that occur in conjunction with various embodiments of the present invention.

At the same time the circuit 54 of FIG. 11 receives two inputs: the drive signal applied to both vibration drivers from the circuit 8 and input from the motion sensor 5. The input from the motion sensor 5 is used by the circuit 54 to determine the appropriate reference excitation signal 56 that should be applied to the vibration driver 52. This is typically a signal proportionally related to the amplitude of the motion sensed by the motion sensor 5, and in phase with the Coriolis forces (in phase with the driven velocity). The reference excitation signal 56, once determined, is then summed with the drive signal from the circuit 8 within the circuit 54 and delivered to the vibration driver 52. The summed signal then serves both the purpose of maintaining the requisite vibration of the vibrating surface 1 and applying the reference excitation as well. With the reference excitation signals applied at both vibration drivers 51, 52, the $M'_{raw}$ signal 9 of FIG. 12 is modulated as shown by the modulation amplitude 58, indicative of a prescribed amount of simulated mass flow rate. This situation is held for a modulation period.

Next, the reference exciter circuitry 19 directs one of the circuit 53 or the circuit 54 (the circuit 54 is directed for this example) to invert the phase of the reference excitation signal 56. This action has the effect of applying reference excitation signals that are in the same phase as each other and therefore represent a zero flow condition to both ends of the vibrating surface 1. While, under perfect conditions, this results in a zero flow signal, or a return to a nominal flow value 57 on M'$_{raw}$ signal 9, in an actual situation where the response at one end of the vibrating surface 1 may have changed with respect to the other end, this may result in a finite amount of offset 59 of the M'$_{raw}$ signal 9 with respect to the nominal value 57. The offset value 59 therefore represents the zero offset of the device at that moment, and can be used to correct the final output signal for any changes in the zero of the device.

Finally, the circuit 20 determines the value of the modulation amplitude 58 and the zero offset 59, and nominal value 57, preferably by using synchronous demodulation methods with input from the reference exciter circuitry 19 for the synchronous reference typically in synchronism with the modulation period. These values are then passed to the circuit 21 where they are used to compensate the M'$_{raw}$ signal 9 and thereby create a corrected M'$_{raw}$ signal 22 according to the following relation (16) representing true mass flow rate:

$$M'_{true} \alpha (\text{nominal value} + \text{zero offset})/(\text{modulation amplitude}) \quad (16)$$

Figure 13:
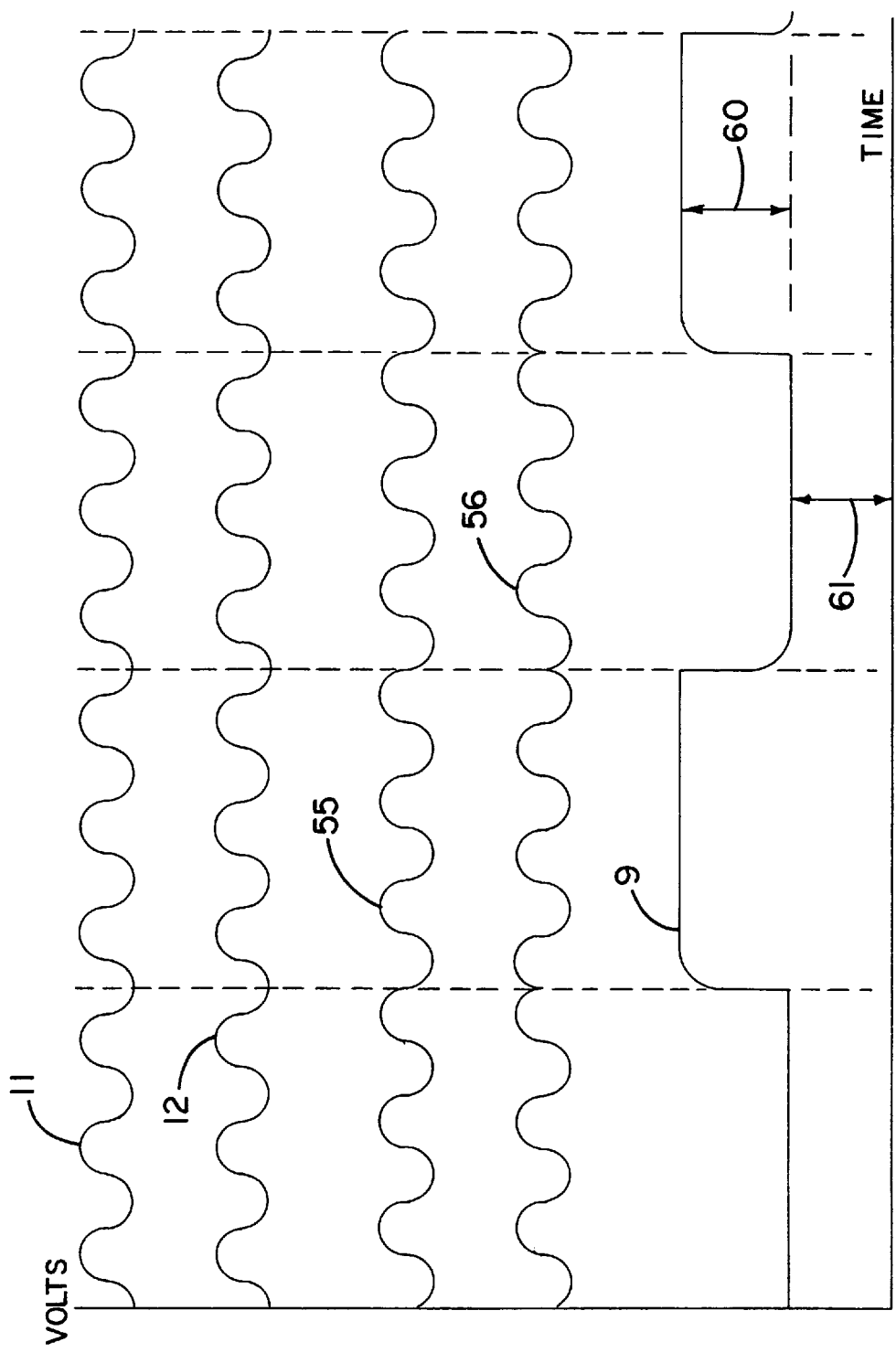
FIG. 13 illustrates electrical signals that occur in conjunction with various embodiments of the present invention.

As in the previous embodiment, the intermittent modulation can be replaced with a method to modulate the M'$_{raw}$ signal 9 as just described but continuously as shown in FIG. 13. This alternate method then applies the reference excitation signals 55, 56 in phase with the Coriolis forces for a modulation period, then the phase of signal 56 is reversed for another modulation period, and this sequence then repeated continuously, preferably never allowing the reference excitation signals to stop. Using this continuous modulation method, the zero offset value 59 of the previous method in FIG. 12 is lost, however compensation for a change in the zero offset is accommodated automatically. M'$_{raw}$ signal 9 is continuously modulated as shown in FIG. 13. During the modulation period where the reference excitation forces are applied out of phase with each other as are the Coriolis forces, M'$_{raw}$ signal 9 increases in value by the modulation amplitude 60. During the next modulation period when the reference excitation forces are applied in phase with each other simulating no (or counteracting) Coriolis forces, M'$_{raw}$ signal 9 decreases in value to the zero modulation value 61. As before, the circuit 20 determines these values 60, 61 by synchronous demodulation and relays the information to the circuit 21 where the M'$_{true}$ signal 22 is created using the following relation (17) representing true mass flow rate:

$$M'_{true} \alpha (\text{zero modulation value})/(\text{modulation amplitude}) \quad (17)$$

Another method for determining the sensitivity and zero, and compensating for any changes therein, involves determining the frequency response values of the Coriolis-deflected shape at one or both motion sensor positions of the vibrating surface 1, determined at the driven mode frequency. It should be noted that, for certain designs, the response may be measured with a single motion sensor, however the preferred method is to use two motion sensors. From these values both sensitivity and zeros can be determined and any changes therein can be compensated for.

As previously mentioned, FIG. 1 represents a vibrating surface 1 of a Coriolis mass flow meter deflected in a driven natural mode of vibration. FIG. 2 represents the deflection of the vibrating surface 1 due to the Coriolis force distribution that thereby occurs as a reaction to mass flow rate. The distorted shape of the vibrating surface 1 in FIG. 2 is due to the Coriolis force distribution; however, it is closely related to the shape of a natural mode of vibration of the vibrating surface 1 (Coriolis mode) that is different than the driven mode of vibration.

Figure 8:
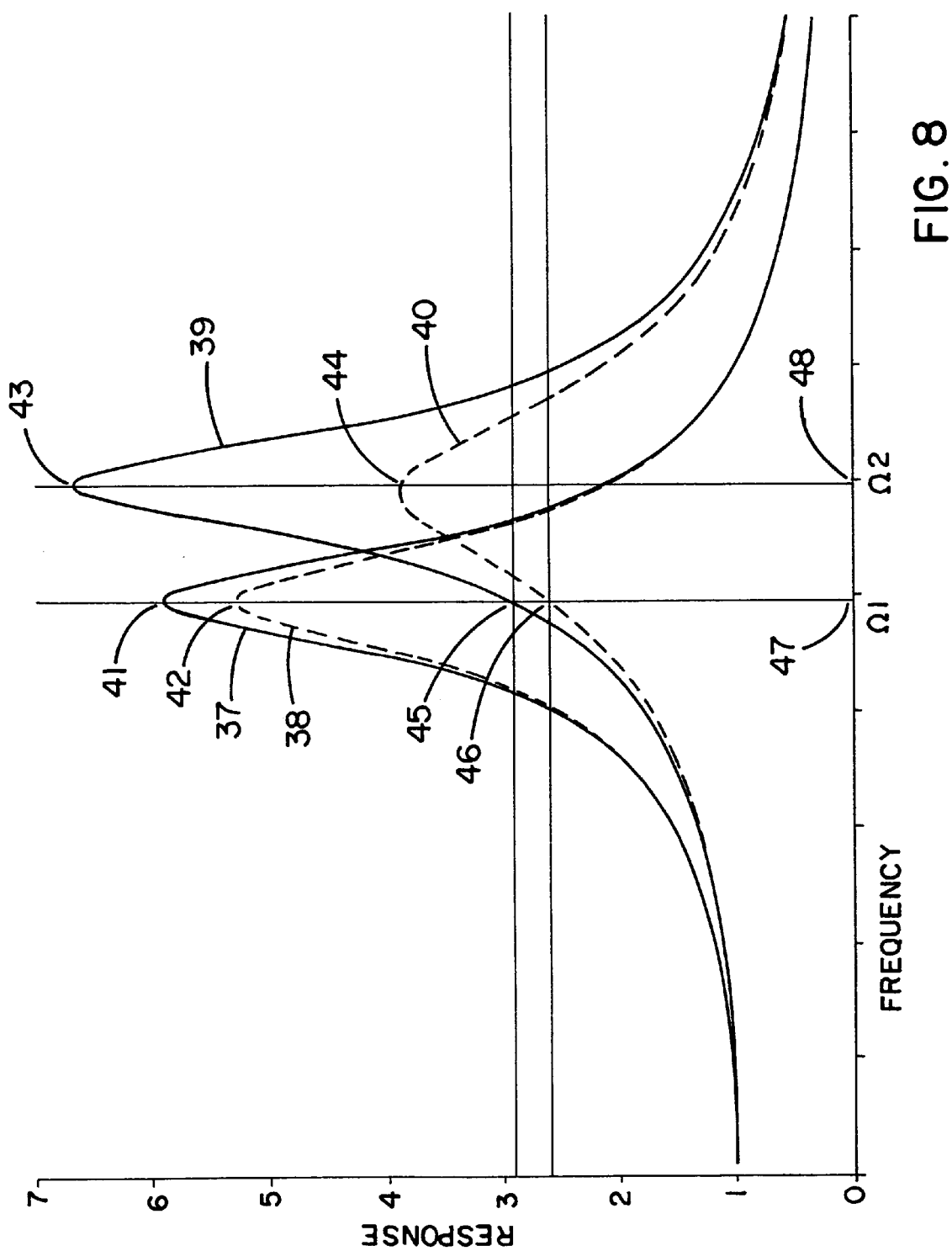
FIG. 8 illustrates characteristic frequency response curves of the driven mode of vibration and the Coriolis mode of vibration.

FIG. 8 represents the frequency response curves of both the driven and Coriolis modes at both motion sensor positions of the vibrating surface 1. A curve 39 represents the dynamic response at the motion sensor 4 due to vibrational energy directed into the Coriolis mode shape as a function of excitation frequency. A curve 40 represents the dynamic response at the motion sensor 5 due to vibrational energy directed into the Coriolis mode shape as a function of excitation frequency. The vibrational energy could be directed into the Coriolis mode shape as a result of Coriolis forces from mass flow rate or as a result of reference excitation from the exciters 6, 7 (or 51, 52 on alternate embodiments). It should be noted that the driven mode of vibration has similar frequency response curves 37, 38 corresponding to the dynamic response at the motion sensors 4, 5 respectively, due to vibrational energy directed into the driven mode shape as a function of excitation frequency.

Figure 14:
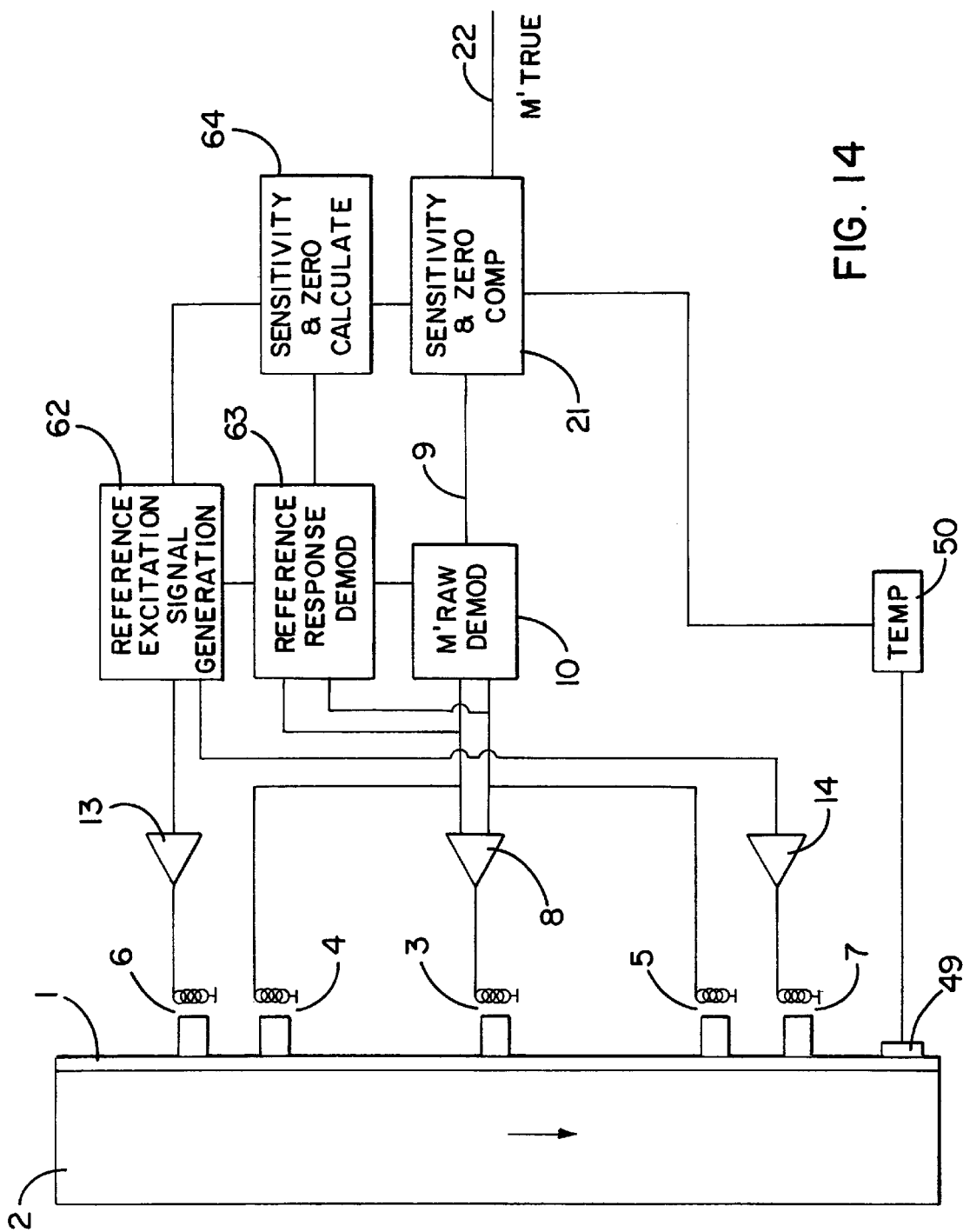
FIG. 14 illustrates an alternate circuit diagram that could be used for the present invention using alternate reference excitation methods.

Peak values 41, 42 of the curves 37, 38 correspond to the driven mode frequency Ω1 47. Peak values 43, 44 of the curves 39, 40 correspond to the Coriolis mode frequency Ω2 48. One important aspect of curves 39, 40 is the frequency response values 45, 46, respectively, determined at the driven mode frequency Ω1 47. These values 45, 46 represent the magnitude of the dynamic response, as seen by the motion sensors 4, 5, from either Coriolis forces from flow rate or reference excitation forces from the exciters 6, 7. They are therefore proportionally related to the sensitivity and the zero offset of the device. The specific mathematical formula relating the values 45, 46 with the sensitivity and zero depends upon the specific method of signal processing that is chosen. However, for this example, the circuit of FIG. 14 is used and therein, the circuit 62 is a signal generator that creates the reference excitation signals at a prescribed frequency, amplitude and phase; and the circuit 63 demodulates the response to that reference excitation. The circuit 64 can calculate the sensitivity and zero of the device using a variety of mathematical relations as hereinafter described.

In the first embodiment previously described, reference excitation forces are applied to the device at the driven mode frequency, and the response to those forces is determined and related to the sensitivity and zero. This is analogous to measuring the response values 45, 46 directly by virtue of the modulation effects on the M'$_{raw}$ signal 9. Similarly, by determining alternate points on the response curves 39, 40 and knowing the shape of those curves, the values 45, 46 thereon can be mathematically determined. Several methods are hereinafter described to determine the values 45, 46 by determining the response values at alternate frequencies and then solving for the response at the driven mode frequency Ω1 47 by knowing or approximating the shape of the curves 39, 40. These values can then be related to the sensitivity and zero offset of the device and any changes therein compensated for.

The equation for the response curves 39, 40 can be approximated by the second order equation (18) below:

$$\text{Response} \approx \text{Force}/[(k - \Omega_x^2 M)^2 + (\Omega_x c)^2]^{1/2} \quad (18)$$

where:

Response=dynamic response amplitude due to the excitation force,

Force=reference excitation force, k=dynamic spring constant (or "stiffness") of the system, c=damping value of the system, $\Omega_x$=excitation frequency and M=dynamic mass of the system.

Inspection of equation (18) reveals the reasons why the sensitivity of a Coriolis mass flow meter can change as a function of fluid and ambient properties. For example, the stiffness (k) can be a function of a combination of effects including the elasticity of the vibrating surface 1 (itself a function of temperature and frequency), and stress level (a function of fluid pressure, differential expansion, axial stress and other factors) of the vibrating surface 1. Similarly, the damping value (c) can change with temperature, fluid viscosity and frequency. The Mass (M) can change with fluid density etc.

Of these variables, the response, force, and excitation frequency are known or can easily be measured leaving the stiffness (k), the damping (c) and the mass (M) to be determined. However, the natural frequency of the Coriolis mode can also be excited and measured for its frequency value and the damping ratio ($\zeta$) can be measured by alternate means hereinafter explained. Therefore, by making appropriate substitutions into equation (18), it can be rewritten into the form of equation (19) involving the stiffness (k), damping ratio ($\zeta$) and frequency ratio (r) leaving only stiffness (k) as the unknown variable.

$$\text{Response} \approx \text{Force}/k[(1-r^2)^2+(\zeta 2r)^2]^{1/2} \qquad (19)$$

where:

r=ratio of excitation to natural frequency and $\zeta$=damping value as a fraction of the critical damping value.

Therefore, by determining the values of the variables of equation (19) the form of the response curves 39, 40 can be mathematically determined and therefore solved for the values 45, 46 at the driven mode frequency $\Omega 1$ 47. These values can then be used to determine and compensate for the sensitivity and zero offset of the device.

The relationship between the response values 45, 46 and the sensitivity and zero offset are typically as follows in relations (20) and (21) understanding that different signal processing techniques may cause the values 45, 46 to have different mathematical relationships yet achieving the same goal of determining the sensitivity and zero, and compensating for any changes therein. For this example, the sensitivity of the device is proportionally related to the sum (or average value) of the response values 45, 46 at both of the motion sensors 4, 5. The zero offset for the device is related to the difference between the response values 45, 46 at the motion sensors 4, 5.

$$\text{Sensitivity } \alpha(\text{response value } \mathbf{45}+\text{response value } \mathbf{46}) \qquad (20)$$

$$\text{Zero } \alpha(\text{response value } \mathbf{45}-\text{response value } \mathbf{46}) \qquad (21)$$

Several methods for the determination of the variables in equation (19) and thus the response values 45, 46 will hereinafter be explained. The basic method employed for these embodiments are as follows (with specific reference to FIGS. 1, 2, 8 and 14). The normal driven mode of vibration is established via the vibration driver 3 and the circuit 8. The circuit 62 then creates reference excitation signals at a frequency (or multiple frequencies) other than the driven frequency $\Omega 1$ 47, and passes these signals on through to the reference exciters 6, 7. The vibrating surface 1 then responds to those reference excitations in a shape similar to that shown in FIG. 2 and at an amplitude according to the reference excitation frequency and the response curves 39, 40. The circuit 63 then receives motion signals from the motion sensors 4, 5 and synchronously demodulates (peak detection, fast Fourier transform ("FFT") and other methods can be used) the response values at the reference excitation frequency (or frequencies) and in the appropriate phase. These values then represent some point(s) along both the curves 39, 40, depending on the selected reference excitation frequency. Once these values are known, then several mathematical methods can be employed to solve for the values 45, 46 on those curves at the driven frequency $\Omega 1$ 47.

Two basic methods are here employed for this purpose. One method is to find an arbitrary point along the curves of 39, 40 and, by assuming the curves fit an equation similar to (18) or (19), solve for points 45, 46. A second method is to determine the response at two points close to the driven frequency $\Omega 1$ 47 along the curves of 39, 40, and then employ interpolation or extrapolation (either linear or nonlinear) techniques to solve for values 45, 46.

Once these values are determined within the circuit 63, the circuit 64 determines the sensitivity and zero based on relations (20) and (21) above (or some other relationship) and passes the information on to the circuit 21 that has the same functionality as in other embodiments and compensates the M'$_{raw}$ signal 9 for any changes in the sensitivity and the zero. A M'$_{true}$ signal 22 is then created that is fully compensated for any changes in the sensitivity and zero, regardless of the cause of those changes. Some specific examples to implement these methods follow.

The Response in equation (19) is the displacement magnitude(s) at each motion sensor 4, 5 from a given reference excitation force. Therefore, the circuit 62 activates the reference exciters 6, 7 intentionally to drive the Coriolis mode frequency with a prescribed excitation force. The resulting amplitudes in the Coriolis mode are the Response values of equation (19) and the prescribed excitation force is the Force value. With the Coriolis mode running at its natural frequency, the ratio (r) of the driven mode to the Coriolis mode is then determined for equation (19). Then $\zeta$ is determined by one of a number of methods, preferably by the logarithmic decrement method that involves periodically turning the Coriolis mode excitation off. The fractional reduction in amplitude ($\Delta$) over a number of cycles (N) of the Coriolis mode is measured and $\zeta$ thereby determined from the relation in equation (22):

$$\zeta \approx \ln(\Delta)/2\pi N \qquad (22)$$

Once $\zeta$ is thus determined, its value can then be substituted back into equation (19) to determine the last variable, the stiffness (k). Once (k) is known, the response curves 39, 40 are thereby determined and can then be solved for their values 45, 46 at the driven frequency $\Omega 1$ 47.

For very small values of $\zeta$, the natural frequency 48 (at the peak values) of the curves 39, 40 can be approximated to be $\Omega 2$. Since most Coriolis mass flow meters are designed to have very low damping values, this is a good approximation. Therefore, if the Coriolis mode of vibration is excited using exciters 6, 7 at its natural frequency $\Omega 2$ 48, the maximum response values 43, 44 due to the prescribed excitation can be measured. This can be accomplished using Fourier transform methods, peak detection methods or synchronous demodulation methods. Assuming that, at this frequency, the value of (r) equals 1, then equation (19) reduces to equation (23) to describe the maximum response value as follows:

$$\text{MaxResponse} \approx 1/(2\zeta) \quad (23)$$

From relation (23), and knowing the maximum response values 43, 44 determined in the circuit 63, the damping factor $\zeta$ can be determined in the circuit 64. This is accomplished by substituting the maximum response values 43, 44 into relation (23) and solving for the corresponding values of $\zeta$. Once these values are known, they can be substituted back into equation (19) to determine the responses for any excitation frequency. For purposes of this discussion, then, the value of the excitation frequency of the driven vibration $\Omega 1$ 47 is therefore substituted into equation (19) (into the value of r where r=$\Omega 1/\Omega 2$) along with the damping factors $\zeta$, and the response values 45, 46 is thus determined.

Once determined, relations (20) and (21) can then be used by the circuit 64 to determine the sensitivity and zero offset values.

Similarly, $\zeta$ can be determined by exciting the $\Omega 2$ frequency 48 with a prescribed excitation and measuring the power necessary to maintain a prescribed amplitude. The power necessary to maintain a given amplitude of vibration (x) can be related to the damping by the following relation (24):

$$\zeta \alpha \text{ Power}/[(\Omega 2)^2 * X^2] \quad (24)$$

Once $\zeta$ is thus determined, its value can then be substituted back into relation (19) to determine the response curves 39, 40. The components and the circuitry to measure power for relation (24) are not shown since they are well understood in the industry. As a simple example however, by measuring the voltage (v) and the current (I) being supplied to the reference exciters necessary to maintain vibration amplitude, the product of (V*I*cos(phase angle between V & I)) yields the driven power, of which a proportional amount is dissipated in the vibration of the Coriolis mode of vibration.

The curves 39, 40 can be determined by the circuit 62 exciting the vibrating surface 1 with white or random noise or a swept frequency wave type excitation (sine, triangle, sawtooth, etc.) and measuring the response to that excitation in the circuit 63 by using direct motion detection methods or by calculating the response spectrum using Fourier transform techniques. Also by sweeping a frequency wave (sine, triangle, sawtooth, etc.) to either side of the Coriolis resonance frequency $\Omega 2$ 48 until the frequency ratios (r2 above resonance, r1 below resonance where the ratio is the excitation frequency divided by the resonance frequency) are found with response values of maximum response/$\sqrt{2}$. Here r2−r1 equals the bandwidth of the response, therefore by measuring this bandwidth, the damping can be determined. $\zeta$ therefore corresponds to a value proportional to the bandwidth divided by 2:

$$\zeta \approx (r2-r1)/2 \quad (25)$$

Once $\zeta$ is thus determined, its value can then be substituted back into equation (19) to determine the response curves 39, 40.

Also by exciting the vibrating surface 1 with the reference exciters 6, 7 at some arbitrary frequency with regard to the Coriolis frequency, and by measuring the phase angle ($\theta$) between the reference excitation and the response to that excitation, and by measuring the Coriolis frequency $\Omega 2$ 48, the damping value $\zeta$ can be thus determined by the following equation (26):

$$\theta \approx \tan^{-1}[(2\zeta r)/(1-r^2)] \quad (26)$$

After $\zeta$ is determined, $\zeta$ and $\Omega 2$ are then substituted back into equation (19) to determine the response values 45, 46 at the driven frequency.

The Field Proving Aspect of the Present Invention

As previously mentioned, an important part of the flow measurement industry is dedicated to the activity of "field proving" of flow meters in order to verify their calibration, usually for custody transfer applications. The methods of field proving usually employed normally include applying a reference flow rate through the meter to be proved by using an ancillary piece of equipment that regulates or independently measures that reference flow rate. Once the reference flow rate has been established, the output of the flow meter to be proven is measured and compared to the reference flow rate to determine the sensitivity of the device. In addition, at a no flow rate condition, the output of the device is measured to determine the zero. These values are then usually documented and compared to previously-measured values or against prescribed, preprogrammed values to determine if the sensitivity or zero has changed. If the sensitivity or zero has changed beyond some preset maximum tolerance, the flow meter is often sent for recalibration.

Coriolis flow meters are unique in that the forces that results from a given amount of mass flow rate can be mathematically determined through equation (8) above, as previously mentioned. Since these forces can be determined, proportionate forces can also be applied and the resulting responses measured to determine the response characteristics of the device.

This method of determining the response characteristics of a flow meter holds for other types of flow measurement devices. However, other flow measurement technologies do not lend themselves as readily to this method as do Coriolis meters, because of the deterministic nature of the Coriolis forces on the vibrating surface 1, and the ease with which proportional forces can be applied to this vibrating surface, thereby simulating a prescribed mass flow rate.

The act of proving a meter implies that the measurement method used to "prove" the meter is more accurate or more believable than the measurement method used in the meter itself, and also that there are two independent measurement systems at work that are being compared.

Therefore, to use the present invention to prove a Coriolis flow meter, the meter is preferably designed and equipped with the necessary instrumentation to measure mass flow rate and compensate the measured flow rate for any anticipated changes in sensitivity due to changes in the aforementioned fluid and ambient parameters. Exemplary of this is any Coriolis flow meter currently commercially available. Therefore a Coriolis flow meter of any type could be used in conjunction with the present invention to create a field provable flow meter. In addition, the meter is equipped with the necessary instrumentation to determine the sensitivity and zero of the device. This is preferably done by the application of reference excitations to simulate a prescribed amount of mass flow. The meter then responds to the reference excitations, causing a change in the output of the device that should be substantially equal to the prescribed simulated flow rate value if the device is working properly. If the device is not working properly, then the output signal deviates from the value represented by the reference excitation. This deviation can then be monitored or compared to prescribed values to determine if the sensitivity or zero of the device has changed.

Alternately, sensitivity and zero determination means can be applied that do not modulate the output signal as just described, but determines the sensitivity and zero of the device and makes these values available for comparison or monitoring purposes.

The elements necessary for a field-provable Coriolis mass flow meter are therefore a Coriolis flow meter of any type or construction, complete with circuitry for measuring the mass flow rate of a fluid. In addition, the vibrating surface of the Coriolis mass flow meter is also equipped with response characteristic determination means. The preferred means of sensitivity and zero determination employs reference exciters as necessary to cause forces on the vibrating surface to evoke a response and preferably to simulate a prescribed amount of mass flow rate and circuitry to determine the sensitivity and zero from the response of the reference excitation. Any of the aforementioned methods to determine the sensitivity or zero of a vibrating surface could be used for this purpose of proving a Coriolis mass flow meter.

The preferred method of proving a Coriolis mass flow meter according to this aspect of the present invention is therefore as follows. First, the mass flow rate is preferably brought to zero or some steady state value so that the additional "flow" as caused by the reference exciters is easily measured as an addition or subtraction to the magnitude of the flow rate that is currently being measured. Once a steady state or zero flow rate is established, the reference exciter is activated, thus causing a prescribed amount of simulated mass flow rate. The simulated mass flow rate is then measured by the Coriolis meter using its normal methods and compensations and the final output signal is read to determine the magnitude of the mass flow rate that the meter measured. Any difference between what the meter measured and the prescribed amount of mass flow rate as represented by the reference exciters thereby represents a change in the sensitivity of the meter that was not effectively compensated for. The difference is usually documented and compared with previous values to watch for any changes over time and often is compared to some critical deviation value beyond which the meter is sent for recalibration.

Alternate methods of determining the response characteristics of the device include any of the aforementioned methods described herein. The difference between the field-provable meter embodiment and those earlier described is that the earlier-described embodiments used various methods to determine the sensitivity and zero of a surface for the purpose of compensating for any changes therein and thereby accurately calculating the mass flow rate, whereas in the field provable meter embodiment, those same methods of sensitivity and zero determination are used, not to calculate the mass flow rate but to compare and/or monitor that determined sensitivity or zero value that characterizes the accuracy of the output signals from that Coriolis flow meter.

From the above description, it is apparent that the present invention provides, in part, a signal processing apparatus and method for measuring a mass flow rate of a fluid flowing in conjunction with a surface of a Coriolis mass flow meter and a field-provable Coriolis mass flow meter. The apparatus includes: (1) a driver for creating a prescribed vibration in the surface, (2) a motion sensor for measuring a motion of the surface, (3) response characteristic determination circuitry, coupled to the motion sensor, for determining a response characteristic of the surface and (4) flow rate calculation circuitry, coupled to the response characteristic determination circuitry, for calculating a measured mass flow rate of the fluid as a function of the motion and the response characteristic. The field-provable meter employs the response characteristic to monitor or compare meter performance without requiring a separate proving device.

Although the present invention and its advantages have been described in detail, those skilled in the art should understand that they can make various changes, substitutions and alterations herein without departing from the spirit and scope of the invention in its broadest form.

What is claimed is:

1. A signal processing apparatus for measuring a mass flow rate of a fluid flowing in conjunction with a surface of a Coriolis mass flow meter, comprising:

a driver for creating a prescribed vibration in said surface;

a motion sensor for measuring a motion of said surface;

response characteristic determination circuitry, coupled to said motion sensor, for determining a response characteristic of said surface; and flow rate calculation circuitry, coupled to said response characteristic determination circuitry, for calculating a measured mass flow rate of said fluid as a function of said motion and said response characteristic.

2. The apparatus as recited in claim 1 wherein said response characteristic determination circuitry determines a frequency response of said surface.

3. The apparatus as recited in claim 2 wherein said response characteristic determination circuitry determines said frequency response from a reference excitation applied to said surface.

4. The apparatus as recited in claim 1 wherein said surface is associated with a conduit, said fluid flowable within said conduit.

5. The apparatus as recited in claim 1 wherein said surface is associated with a conduit, said fluid flowable without said conduit.

6. The apparatus as recited in claim 1 wherein said driver is selected from the group consisting of:

a magnet/coil pair, an electrostatic driver, and a piezoelectric driver.

7. The apparatus as recited in claim 3 wherein said reference excitation is selected from the group consisting of:

a force proportional to a reference mass flow rate, a force proportional to a rotational velocity of said surface, a force proportional to said prescribed vibration of said surface, a Coriolis mode of vibration, a force at an arbitrary frequency, white or random noise, and a swept frequency wave.

8. The apparatus as recited in claim 1 wherein said motion sensor is selected from the group consisting of:

a magnet/coil pair, an electrostatic sensor, a piezoelectric sensor, an optical sensor, and a strain gage.

9. The apparatus as recited in claim 1 wherein said flow rate calculation circuitry calculates said measured mass flow rate of said fluid as a function of a one selected from the group consisting of:

time delay, phase angle, amplitude, velocity, acceleration, and motion multiplied by frequency raised to a power N, where N is any positive or negative real number or integer.

10. The apparatus as recited in claim 1 wherein said flow rate calculation circuitry determines response at a driven vibration frequency and determines a one selected from the group consisting of:
 damping ratio according to a response curve and a peak value,
 damping ratio by determining the bandwidth of a response curve,
 damping ratio by a logarithmic decrement method, and
 damping ratio as a function of phase angle between excitation and response.

11. The apparatus as recited in claim 1 wherein said flow rate calculation circuitry calculates a one selected from the group consisting of:
 a Fourier transform of said prescribed vibration and said reference excitation, and
 a power necessary to maintain a Coriolis mode amplitude.

12. The apparatus as recited in claim 1 wherein said response characteristic determination circuitry determines a sensitivity.

13. The apparatus as recited in claim 1 wherein said response characteristic determination circuitry determines a zero.

14. The apparatus as recited in claim 3 wherein said response to said reference excitation is selected from the group consisting of:
 an intermittent modulation of a mass flow-related signal,
 a continuous modulation of a mass flow-related signal,
 an average modulated value of a mass flow-related signal,
 a magnitude of peak to peak modulation,
 a magnitude of response motion,
 a difference between modulated amplitude and average flow rate value, and
 a ratio of response in a Coriolis mode to response in a driven mode.

15. The apparatus as recited in claim 1 further comprising a temperature sensor and a temperature compensation circuit.

16. A method of measuring a mass flow rate of a fluid flowing in conjunction with a surface of a Coriolis mass flow meter, comprising the steps of:
 creating a prescribed vibration in said surface;
 measuring a motion of said surface;
 determining a response characteristic of said surface; and
 calculating a measured mass flow rate of said fluid as a function of said motion and said response characteristic.

17. The method as recited in claim 16 wherein said step of determining said response characteristic comprises the step of determining a frequency response of said surface.

18. The method as recited in claim 17 wherein said step of determining said frequency response comprises the step of determining said frequency response from a reference excitation applied to said surface.

19. The method as recited in claim 16 wherein said surface is associated with a conduit, said fluid flowable within said conduit.

20. The method as recited in claim 16 wherein said surface is associated with a conduit, said fluid flowable without said conduit.

21. The method as recited in claim 16 wherein a driver performs said step of creating, said driver selected from the group consisting of:
 an electrostatic driver,
 a magnet/coil pair, and
 a piezoelectric driver.

22. The method as recited in claim 18 wherein said prescribed vibration is selected from the group consisting of:
 a force proportional to said mass flow rate,
 a force proportional to a rotational velocity of said surface,
 a force proportional to said prescribed vibration of said surface,
 a Coriolis mode of vibration,
 a force at an arbitrary frequency,
 white or random noise, and
 a swept frequency wave.

23. The method as recited in claim 16 wherein a motion sensor performs said step of measuring, said sensor selected from the group consisting of:
 an electrostatic sensor,
 a magnet/coil pair,
 a piezoelectric sensor,
 an optical sensor, and
 a strain gage.

24. The method as recited in claim 16 wherein said step of calculating comprises the step of calculating said measured mass flow rate of said fluid as a function of a one selected from the group consisting of:
 time delay,
 phase angle,
 amplitude,
 velocity,
 acceleration, and
 motion multiplied by frequency raised to the power N, where N is any positive or negative real number or integer.

25. The method as recited in claim 16 further comprising the steps of:
 determining response at a driven vibration frequency, and
 determining a one selected from the group consisting of:
  damping ratio according to a response curve and a peak value,
  damping ratio by determining the bandwidth of a response curve,
  damping ratio by a logarithmic decrement method, and
  damping ratio as a function of phase angle between excitation and response.

26. The method as recited in claim 16 wherein said step of calculating comprises the step of calculating a one selected from the group consisting of:
 a Fourier transform of said prescribed vibration and said reference excitation, and
 a power necessary to maintain a Coriolis mode amplitude.

27. The method as recited in claim 16 wherein said step of determining a response characteristic comprises the step of determining a sensitivity of said surface.

28. The method as recited in claim 16 wherein said step of determining a response characteristic comprises the step of determining a zero.

29. The method as recited in claim 18 wherein said response to said reference excitation is selected from the group consisting of:
 an intermittent modulation of a mass flow-related signal,
 a continuous modulation of a mass flow-related signal,
 an average modulated value of a mass flow-related signal, a magnitude of peak to peak modulation, a magnitude of response motion, a difference between modulated amplitude and average flow rate value, and a ratio of response in a Coriolis mode to response in a driven mode.

30. The method as recited in claim 16 further comprising the step of measuring and compensating for a temperature.

31. A field-provable Coriolis mass flow meter, comprising:

a motion sensor for measuring a motion of a surface of said Coriolis mass flow meter; and response characteristic determination circuitry for determining a response characteristic of said surface of said Coriolis mass flow meter as a function of said motion, said response characteristic employable for monitoring a performance of said meter.

32. The meter as recited in claim 31 wherein said response characteristic determination circuitry comprises circuitry for determining a frequency response of said surface.

33. The meter as recited in claim 32 wherein said response characteristic determination circuitry determines said frequency response from a reference excitation applied to said surface.

34. The meter as recited in claim 31 wherein said surface is associated with a conduit, said fluid flowable within said conduit.

35. The meter as recited in claim 31 wherein said surface is associated with a conduit, said fluid flowable without said conduit.

36. The meter as recited in claim 33 wherein said reference excitation is selected from the group consisting of:

a force proportional to a reference mass flow rate, a force proportional to a rotational velocity of said surface, a force proportional to said prescribed vibration of said surface, a Coriolis mode of vibration, a force at an arbitrary frequency, white or random noise, and a swept frequency wave.

37. The meter as recited in claim 31 wherein said response characteristic determination circuitry determines response at a driven vibration frequency and determines a one selected from the group consisting of:

damping ratio according to a response curve and a peak value, damping ratio by determining the bandwidth of a response curve, damping ratio by a logarithmic decrement method, and damping ratio as a function of phase angle between excitation and response.

38. The meter as recited in claim 31 wherein said response characteristic determination circuitry calculates a one selected from the group consisting of:

a Fourier transform of said prescribed vibration, and a power necessary to maintain a Coriolis mode amplitude.

39. The meter as recited in claim 33 wherein said response to said reference excitation is selected from the group consisting of:

an intermittent modulation of a mass flow-related signal, a continuous modulation of a mass flow-related signal, an average modulated value of a mass flow-related signal, a magnitude of peak to peak modulation, a magnitude of response motion, a difference between modulated amplitude and average flow rate value, and a ratio of response in a Coriolis mode to response in a driven mode.

40. The meter as recited in claim 31 wherein said response characteristic determination circuitry determines a sensitivity.

41. The meter as recited in claim 31 wherein said response characteristic determination circuitry determines a zero.

42. The meter as recited in claim 31 further comprising a temperature sensor and a temperature compensation circuit.

43. A method of field-proving a Coriolis mass flow meter, comprising the steps of:

measuring a mass flow rate with said Coriolis mass flow meter;

calculating a response characteristic of a surface of said Coriolis mass flow meter; and monitoring said response characteristic of said Coriolis mass flow meter with respect to said measured mass flow rate.

44. The method as recited in claim 43 wherein said step of calculating said response characteristic comprises the step of determining a frequency response of said surface.

45. The method as recited in claim 43 wherein said step of determining a frequency response comprises the step of determining said frequency response from a reference excitation applied to said surface.

46. The method as recited in claim 43 wherein said surface is associated with a conduit, said fluid flowable within said conduit.

47. The method as recited in claim 43 wherein said surface is associated with a conduit, said fluid flowable without said conduit.

48. The method as recited in claim 45 wherein said reference excitation is selected from the group consisting of:

a force proportional to a reference mass flow rate, a force proportional to a rotational velocity of said surface, a force proportional to a prescribed vibration of said surface, a Coriolis mode of vibration, a force at an arbitrary frequency, white or random noise, and a swept frequency wave.

49. The method as recited in claim 43 wherein said step of calculating a response characteristic comprises the steps of calculating response at a driven vibration frequency and determining a one selected from the group consisting of:

damping ratio according to a response curve and a peak value, damping ratio by determining the bandwidth of a response curve, damping ratio by a logarithmic decrement method, and damping ratio as a function of phase angle between excitation and response.

50. The method as recited in claim 43 wherein said step of calculating a response characteristic comprises the step of calculating a one selected from the group consisting of:

a Fourier transform of said prescribed vibration, and a power necessary to maintain a Coriolis mode amplitude.

51. The method as recited in claim 45 wherein said response to said reference excitation is selected from the group consisting of:

an intermittent modulation of a mass flow-related signal, a continuous modulation of a mass flow-related signal, an average modulated value of a mass flow-related signal, a magnitude of peak to peak modulation, a magnitude of response motion, a difference between modulated amplitude and average flow rate value, and a ratio of response in a Coriolis mode to response in a driven mode.

52. The method as recited in claim 43 wherein said step of calculating comprises the step of calculating a sensitivity.

53. The method as recited in claim 43 wherein said step of calculating comprises the step of calculating a zero.

54. The method as recited in claim 43 further comprising the step of measuring and compensating for a temperature.

* * * * *

UNITED STATES PATENT AND TRADEMARK OFFICE
CERTIFICATE OF CORRECTION

PATENT NO. : 5,907,104
DATED : May 25, 1999
INVENTOR(S) : Donald R. Cage, et al It is certified that error appears in the above-identified patent and that said Letters Patent is hereby corrected as shown below:

Col. 21, line 24 "$M'_{raw}$" should be --$M'_{true}$--.

Signed and Sealed this

Twelfth Day of October, 1999

Attest:

Q. TODD DICKINSON

*Attesting Officer*  *Acting Commissioner of Patents and Trademarks*